United States Patent

Kasai et al.

[11] Patent Number: 6,104,557
[45] Date of Patent: Aug. 15, 2000

[54] MAGNETIC DISK REPRODUCTION WITH OFFSET COMPENSATION FOR THERMAL ASPERITY

[75] Inventors: Kiichiro Kasai; Toshiki Kimura, both of Kawasaki, Japan

[73] Assignee: Fujitsu Limited, Kawasaki, Japan

[21] Appl. No.: 08/790,422

[22] Filed: Jan. 30, 1997

[30] Foreign Application Priority Data

May 31, 1996 [JP] Japan .................................. 8-139060

[51] Int. Cl.⁷ .............................. G11B 5/09; G11B 5/02
[52] U.S. Cl. ................................................. 360/46; 360/25
[58] Field of Search .............................. 327/311; 360/46, 360/67, 70, 32, 25, 53

[56] References Cited

U.S. PATENT DOCUMENTS

| | | | |
|---|---|---|---|
| 5,057,785 | 10/1991 | Chung et al. | 327/311 |
| 5,214,546 | 5/1993 | Yamada | 360/70 X |
| 5,233,482 | 8/1993 | Galbraith et al. | 360/46 |
| 5,367,409 | 11/1994 | Ottesen et al. | 360/32 |
| 5,715,110 | 2/1998 | Nishiyama et al. | 360/67 |
| 5,719,984 | 2/1998 | Yamagata et al. | 360/31 |

FOREIGN PATENT DOCUMENTS

| | | |
|---|---|---|
| 3-235206 | 10/1991 | Japan . |
| 6-60307 | 3/1994 | Japan . |
| 6-131612 | 5/1994 | Japan . |

*Primary Examiner*—W. Chris Kim
*Attorney, Agent, or Firm*—Greer, Burns & Crain, Ltd.

[57] ABSTRACT

A magnetic disk reproducing apparatus for reproducing data recorded at an arbitrary position on a rotating disk by a head includes a level detecting unit for detecting a level of a DC component of a reproduced signal outputted from the head; a delaying unit for delaying the reproduced signal by a predetermined value; and a correcting unit for correcting the level of the DC component of the reproduced signal outputted from the delaying unit when the level of the DC component detected by the level detecting unit becomes larger than a predetermined threshold level. Preferably, a control method of a magnetic disk reproducing apparatus having such a construction includes the steps of detecting a level of a DC component of a reproduced signal outputted from the head; delaying the reproduced signal by a predetermined value; and correcting the level of the DC component of the delayed reproduced signal when the level of the DC component so detected becomes larger than a predetermined threshold level.

19 Claims, 32 Drawing Sheets

POSITION OF Fig.22 (3c)

POSITIONS OF Fig.24

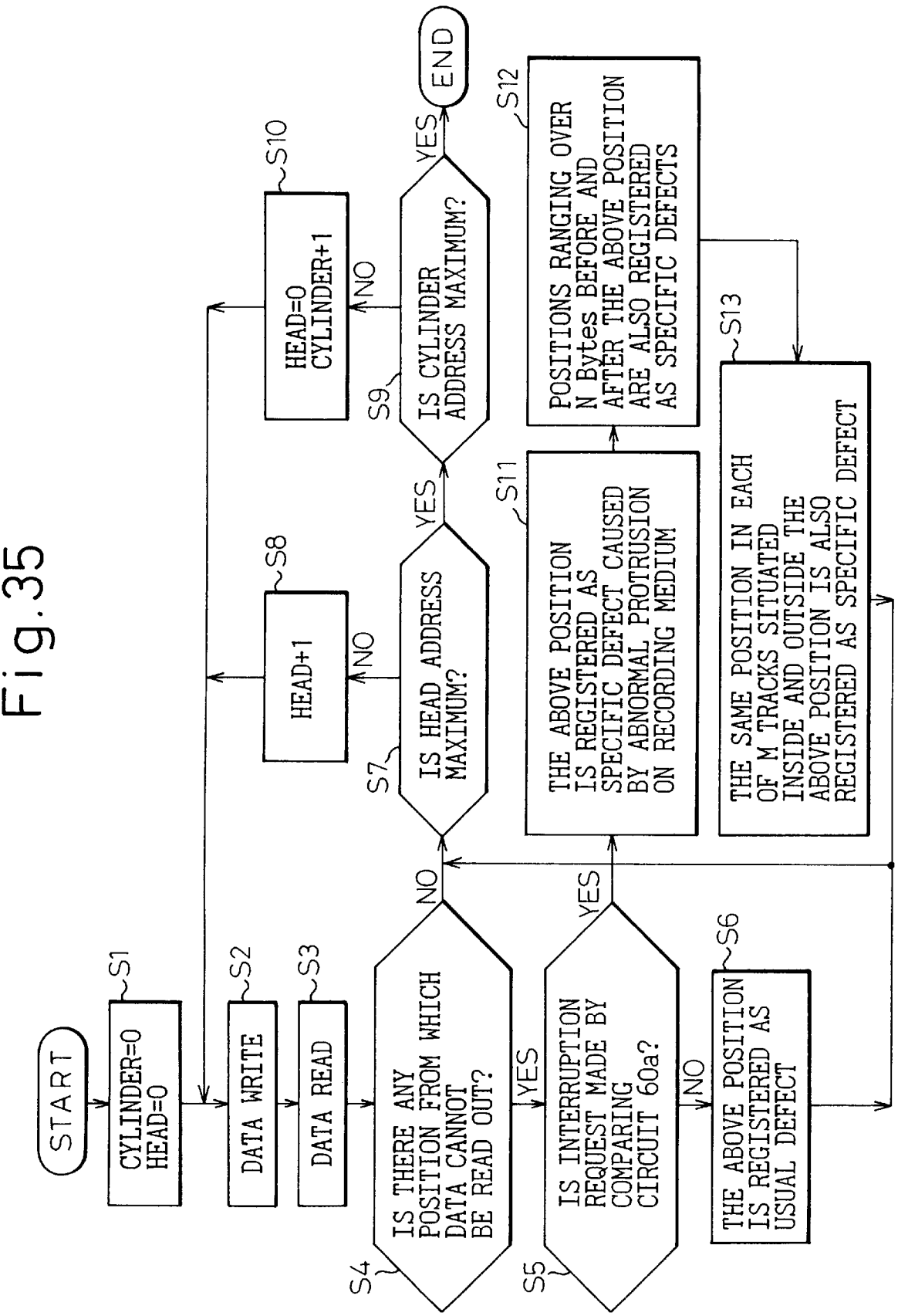

MAGNETIC DISK REPRODUCTION WITH OFFSET COMPENSATION FOR THERMAL ASPERITY

BACKGROUND OF THE INVENTION

1. Field of the Invention

This invention relates to a magnetic disk reproducing apparatus and to a control method for controlling the magnetic disk reproducing apparatus. More particularly, this invention relates to a magnetic disk reproducing apparatus for detecting and correcting thermal asperity and to a control method for such a magnetic disk reproducing apparatus.

Recently, magnetic disk reproducing apparatuses using a magnetoresistance effect type head (MR head), which in turn uses a magnetoresistive element (MR element), have become available. Even more recently, the flying height of the MR head has been reduced to obtain a higher recording density, and a problem concerning thermal asperity, or in other words, the fluctuation of the waveform of a reproduced signal resulting from the heat of friction caused by a collision between a protrusion on a disk medium and the MR head, has appeared. Therefore, a magnetic disk reproducing apparatus (e.g., a magnetic disk drive) which is capable of correcting a reproduced signal and reading out correct data even when thermal asperity occurs, has been required.

2. Description of the Related Art

The storage capacity (i.e., memory capacity) of magnetic disk drives has been increasing in recent years. An increase in recording density is the main contributor to the increase in the storage capacity. A method of increasing the recording density can be generally classified into the following two methods. One is the method of increasing the number of data tracks in a radial direction, and the other is the method of increasing the storage capacity in a circumferential direction.

Some of the latest magnetic disk drives increase the memory capacity in the circumferential direction by using the MR element for the reproducing head and, in order to further increase the storage capacity, it has become necessary to reduce the flying height of the reproducing head (MR head) from the medium surface and to improve the S/N (signal to noise) ratio in the output of the reproducing head.

Here, the MR element has a feature that its electric resistance changes in accordance with the change of an external magnetic field. The MR head utilizes this feature of the MR element, causes a predetermined current to flow through the MR element, and picks up magnetization on the medium as a voltage signal. Unlike an inductive head, the MR head can easily extract the signal even when the medium is rotating at a low rotating speed, and is therefore an effective means for increasing the storage capacity of the magnetic disk reproducing apparatus and for reducing its size.

FIG. 1 is a schematic view useful for explaining thermal asperity that occurs when the magnetoresistance effect type head (MR head) is used. In the drawing, reference numeral 1 denotes a disk (medium); reference numeral 10 the surface of the disk medium; reference numeral 10a a protrusion; reference numeral 20 a head suspending portion; and 24 the MR head.

When the surface 10 of the disk medium 1 is observed microscopically, protrusions 10a occur on the surface 10 of the disk medium 1 due to the change in quality with the lapse of time or the like, for example, in the magnetic disk reproducing apparatus (hard disk apparatus), as shown in FIG. 1. When the flying height of the MR head is reduced so as to increase the storage capacity, the MR head impinges against the protrusions 10a on the surface of the disk medium, and thermal asperity, which brings about the fluctuation of the waveform of the reproduced signal, causes a problem.

In other words, when the flying height of the MR head is reduced to accomplish a higher recording density, a collision of the MR head against protrusions (protruding portions) occurs. This collision generates heat of friction in the MR head and brings about a change (increase) in the electric resistance due to a temperature rise in the MR device, so that thermal asperity occurs which causes a fluctuation of the waveform of the reproduced signal.

FIG. 2 is a signal waveform diagram showing the fluctuation of the DC (direct current) level of the reproduced signal due to thermal asperity.

Assuming that the protrusion 10a exists on the surface 10 of the disk medium 1 due to some problems caused during fabrication process for the disk medium, for example, as shown in FIG. 2, the MR head 24 impinges against the protrusion 10a on the disk medium, and the DC level of the reproduced signal greatly changes due to thermal asperity and in some cases, an abnormal waveform occurs.

Though this abnormal waveform returns to the original waveform within several micro seconds ($\mu$sec), the data cannot be correctly demodulated during this period of several micro seconds). The portions from which the data cannot be correctly read out can be registered as a medium defect and the use of the portions can be inhibited before shipment of the apparatus. However, since the defective portion (protrusion) always repeats collisions with the head, there is a possibility that the defect on the medium surface expands in the radial/circumferential directions by the change in quality with the lapse of time, and the possibility of the occurrence of a new protrusion on the surface of the medium disk 10 due to the change in quality with the lapse of time, also exists. It is not possible to register the medium defect before shipment of the apparatus, with regard to the change (occurrence and expansion of the protrusion) of the surface condition of the disk medium due to such a change in quality with the lapse of time.

FIGS. 3 to 6 are signal waveform diagrams showing the first to fourth examples of the level fluctuation of reproduced signals by a simulation technique when thermal asperity occurs. FIGS. 3 to 6 represent the cases in which the time constants of thermal asperity are set as $\tau=200$, $\tau=400$, $\tau=500$ and $\tau=600$, respectively. Data is obtained by connecting random data at sample points with each other. A signal level (amplitude) of 1.5 is assumed as the dynamic range of the circuit. When the amplitude exceeds this value 1.5, the waveform gets into saturation and in the interim, the data cannot be demodulated.

As shown in FIGS. 3 to 6, when the MR head impinges against the protrusion on the disk medium, for example, the waveform of the reproduced signal fluctuates due to thermal asperity. In other words, because the MR head converts the resistance of the MR element to a voltage, the resistance of the MR element changes (becomes large) due to the heat of friction if the protrusion on the disk medium impinges against the MR head and generates the heat of friction, and the waveform drastically fluctuates (rises). As a result, the reproduced signal exceeds a capacity of an automatic gain control circuit (AGC circuit) which adjusts the waveform envelope to a constant value, or exceeds the dynamic range of the signal processing circuit, and the reproduced signal gets into saturation. In consequence, the recorded data cannot be demodulated. More concretely, 256 bits cannot be demodulated in FIG. 3, 521 bits in FIG. 4, 775 bits in FIG. 5 and 1,128 bits, in FIG. 6.

As described above, when thermal asperity occurs, the level of the reproduced signal drastically rises and the demodulation cannot be carried out. As the heat is radiated, the MR head whose temperature rises due to the heat of friction thereafter returns to the normal temperature, and the level fluctuation of the reproduced signal damps exponentially. Here, as obvious from FIGS. 3 to 6, the fluctuation of the reproduced level due to thermal asperity exhibits characteristics in which as the value of the time constant τ of thermal asperity, becomes larger the number of bits that cannot be demodulated also becomes larger. With regard to the damping of the level fluctuation, too, the level returns to the original level in accordance with a function corresponding to the value of the time constant τ of thermal asperity.

To address this thermal asperity, U.S. Pat. No. 5,233,482 discloses a certain solution. This prior art reference describes a technique for holding an AGC circuit (automatic gain control circuit) for adjusting the envelope of the reproduced waveform, and a technique for shortening the time necessary for holding the AGC circuit. More concretely, the above reference describes a method of eliminating the number of bits of the waveform fluctuation by changing the cutoff frequency by using an AC (alternating current) coupling capacitor, and a method of eliminating saturation of the waveform due to thermal asperity by expanding the operating range of the ADC. However, because this method is not a method for correcting thermal asperity itself, there is a limit with respect to a decrease in a time period represented by the number of bits (bit number) in which an error concerning demodulated data occurs.

SUMMARY OF THE INVENTION

In view of the problems of the prior art described above, the present invention is directed to providing a technology of reproducing a magnetic disk which can read out correct data by correcting reproduced signals even when thermal asperity occurs.

To accomplish the object described above, the present invention provides a magnetic disk reproducing apparatus for reproducing data recorded at an arbitrary position on a rotating disk by a head, which includes level detecting means for detecting a level of a DC component of a reproduced signal outputted from the head; delaying means for delaying the reproduced signal by a predetermined value; and correcting means for correcting the level of the DC component of the reproduced signal outputted from the delaying means when the level of the DC component detected by the level detecting means becomes larger than a predetermined threshold level.

Preferably, the magnetic disk reproducing apparatus according to the present invention is a magnetic disk reproducing apparatus for reproducing data recorded at a plurality of positions on a rotating disk by a head, which includes level detecting means for detecting an average level of reproduced signals outputted from the head until the lapse of a predetermined time from the reproduction of the data recorded at one of a plurality of positions; and level comparing means for comparing the average level outputted from the level detecting means with a level of the reproduced signal obtained by reproducing the data recorded at one position on the disk described above. In this case, the level comparison means judges that a defect exists in the proximity of one position described above when the average level is larger than the level of the reproduced signal of the data recorded at one position described above.

Further, the magnetic disk reproducing apparatus according to the present invention preferably includes a level detecting unit for detecting a level of a DC component of an analog reproduced signal outputted from the head so as to reproduce the data recorded at an arbitrary position on a track of a rotating disk; a delaying circuit for delaying the analog reproduced signal outputted from the head; a correcting unit for correcting a level of a DC component of an analog reproduced signal when the level of the DC component detected by the level detecting unit becomes greater than a predetermined threshold level; and an analog/digital converting unit for converting the analog reproduced signal, the level of the DC component of which is corrected by the correcting unit to a digital reproduced signal.

Further, to reproduce data recorded on an arbitrary track on a rotating disk by a head, the magnetic disk reproducing apparatus according to the present invention preferably includes a level detecting unit for detecting a level of a DC component of an analog reproduced signal outputted from the head; a delaying circuit for delaying the analog reproduced signal by a predetermined value; an analog/digital converting unit for converting an analog detection signal detected by the level detecting unit and representing a level of the DC component and an analog reproduced signal outputted from the delaying circuit, to a digital detection signal and a digital reproduced signal by sampling, respectively; and a correcting unit for correcting the level of the DC component of the digital reproduced signal when the level of the DC component contained in the digital detection signal becomes larger than a predetermined threshold level.

Preferably, further, the level detecting unit of the present invention compares the waveform of the reproduced signal described above with a predetermined threshold level, and gives a report to the correcting unit to the effect that the level of the DC component of the reproduced signal must be corrected when the waveform of the reproduced signal exceeds the threshold level.

Preferably, further, the level detecting unit of the present invention includes a first comparator, a low pass filter and a second comparator.

Preferably, further, the magnetic disk reproducing apparatus of the present invention corrects the level of the DC component when the level of the DC component of the reproduced signal continues to exceed the threshold level for at least a predetermined time.

Preferably, further, the magnetic disk reproducing apparatus of the present invention corrects the level of the DC component when the phenomenon in which the level of the DC component nearly exceeds, or does not exceed, occurs at a predetermined frequency or any other frequency higher than the predetermined frequency and moreover, when this switching phenomenon continues for at least a predetermined time.

Preferably, further, in the magnetic disk reproducing apparatus of the present invention, a plurality of the threshold levels described above are set.

Preferably, further, in the magnetic disk reproducing apparatus of the present invention, a plurality of threshold levels are set, and a signal passed through the low pass filter is compared with another threshold level.

Preferably, further, in the magnetic disk reproducing apparatus of the present invention, a plurality of the threshold levels are set, and are switched at a predetermined frequency or any other frequency higher than the predetermined frequency.

Preferably, further, in the magnetic disk reproducing apparatus of the present invention, the analog reproduced signal described above is passed through the low pass filter, a threshold level is set to the output of this low pass filter, and the level of the DC component is corrected when the output exceeds the threshold level for at least a predetermined time.

Preferably, further, in the magnetic disk reproducing apparatus of the present invention, a selector selects an operation mode so that correction is made only when thermal asperity exists.

Preferably, further, the magnetic disk reproducing apparatus of the present invention includes a voltage adder for applying a voltage bias to the analog reproduced signal described above.

Preferably, further, the magnetic disk reproducing apparatus of the present invention applies a high pass filter to a step function, adds the result to the analog reproduced signal, and executes a correction process on the basis of the addition result.

Preferably, further, the magnetic disk reproducing apparatus of the present invention determines the transmission function of the high pass filter by utilizing the switching time between a high level "H" and a low level "L" of the output signal of the comparator.

Preferably, further, the magnetic disk reproducing apparatus of the present invention starts a correction process when the level of the reproduced signal becomes larger than the threshold level, and finishes a correction process when the level of the reproduced signal becomes smaller than the threshold level.

Preferably, further, the magnetic disk reproducing apparatus of the present invention stops the clock of a variable frequency oscillator for the time corresponding to a product obtained by multiplying the time in which the level of the reproduced signal continues to exceed one of a plurality of the threshold levels, by a predetermined constant, and keeps the oscillation frequency of the variable frequency oscillator fixed.

Preferably, further, the magnetic disk reproducing apparatus extracts the clock of the variable frequency oscillator in accordance with the low level "L" and the high level "H" of the output signal of the comparator, or fixes the oscillation frequency of the variable frequency oscillator.

Preferably, further, the magnetic disk reproducing apparatus of the present invention fixes the gain of an automatic gain control circuit for the time corresponding to a product obtained by multiplying the time in which the level of the reproduced signal continues to exceed one of a plurality of the threshold levels, by a predetermined constant.

Preferably, further, the magnetic disk reproducing apparatus of the present invention makes variable, or fixes, the gain of the automatic gain control circuit in accordance with the low level "L" and the high level "H" of the output signal of the comparator.

Preferably, further, in the magnetic disk reproducing apparatus of the present invention, level detecting means includes a level detecting unit containing a filter for removing noise.

Preferably, further, in the magnetic disk reproducing apparatus of the present invention, the level comparison means described above includes a comparison circuit having a filter for removing noise.

Preferably, further, the magnetic disk reproducing apparatus of the present invention includes a microprocessor unit for receiving the output representing that the output of the comparison circuit is a defective output.

Preferably, further, the magnetic disk reproducing apparatus of the present invention registers defects at the same position of a defective track, and positions before and after the former position.

Preferably, further, the magnetic disk reproducing apparatus of the present invention counts the number of defects for each head, and does not use the area of the head when the thus counted number exceeds a predetermined value.

Preferably, further, the magnetic disk reproducing apparatus of the present invention registers the defect at the same position of preceding and subsequent tracks when the output of the comparison circuit does not exist and when the register position of the defect for each head is the same and addresses are adjacent to each other.

Preferably, further, the magnetic disk reproducing apparatus of the present invention does not use the area of the head when the output of the comparison circuit exists and when the register position of the defect for each head is the same and addresses are adjacent.

Preferably, further, in the magnetic disk reproducing apparatus of the present invention, the head includes a magnetoresistance effect type head using a magnetoresistive element, and corrects fluctuation of the reproduced signal resulting from collision between this magnetoresistance effect type head and a protrusion on the disk.

On the other hand, when a magnetic disk reproducing apparatus is controlled for reproducing data recorded at an arbitrary position on a rotating disk by a head, a control method of a magnetic disk reproducing apparatus according to the present invention includes the steps of detecting a level of a DC component of a reproduced signal outputted from the head; delaying the reproduced signal by a predetermined value; and correcting the level of the DC component of the delayed reproduced signal when the level of the DC component so detected becomes larger than a predetermined threshold level.

Preferably, further, a control method of a magnetic disk reproducing apparatus according to the present invention is a method of controlling a magnetic disk reproducing apparatus for reproducing data recorded at a plurality of positions on a rotating disk by a head, and includes the steps of detecting an average level of reproduced signals outputted from the head until the lapse of a predetermined time from the reproduction of the data recorded at one position of a plurality of positions; comparing the average level so detected with a level of a reproduced signal obtained by reproducing the data recorded at one position on the disk; and judging that a defect exists in the proximity of the one position described above when the average level is larger than the level of the reproduced signal of the data recorded at one position.

Preferably, further, a control method of a magnetic disk reproducing apparatus according to the present invention is a method of controlling a magnetic disk reproducing apparatus for reproducing data recorded at an arbitrary position of a track on a rotating disk by a head, and includes the steps of detecting a level of a DC component of an analog reproduced signal outputted from the head; delaying the analog reproduced signal by a predetermined value; correcting the level of the DC component of the analog reproduced signal so delayed when the level of the detected DC component becomes larger than a predetermined threshold level;

and converting the analog reproduced signal the level of the DC component of which is corrected to a digital reproduced signal.

Preferably, further, when a magnetic disk reproducing apparatus for reproducing data recorded in an arbitrary track on a rotating disk by a head is controlled, a control method of a magnetic disk reproducing apparatus according to the present invention includes the steps of detecting a level of a DC component of an analog reproduced signal outputted from the head; delaying the analog reproduced signal by a predetermined value; converting the analog detection signal representing the level of the detected DC component and the analog reproduced signal so delayed, to a digital detection signal and a digital reproduced signal by a sampling technique, respectively; and correcting the level of the DC component of the digital reproduced signal when the level of the DC component contained in the digital detection signal becomes larger than a predetermined threshold level.

According to the first aspect of the present invention, the magnetic disk reproducing apparatus reproduces data recorded at an arbitrary position on a rotating disk by a head, and the output of this head (reproduced signal) is supplied to level detecting means and to delaying means through a read/write control unit.

The level detecting means detects the level of a DC component of the reproduced signal outputted from the head, and when the level of the DC component detected by this level detecting means becomes larger than a predetermined threshold level, correcting means corrects the level of the DC component of the reproduced signal outputted from the delaying means. Here, the delaying means delays the reproduced signal by a predetermined value, and this delaying means synchronizes level detection of the reproduced signal by the level detecting means with correction of the reproduced signal by the correcting means on the basis of the detection result.

According to the second aspect of the present invention, on the other hand, data recorded at a plurality of positions on a rotating disk are reproduced by a head, and the output of this head (reproduced signal) is supplied to the level detecting means and level comparing means through the read/write control unit.

The level detecting means detects an average level of reproduced signals outputted from the head until the lapse of a predetermined time from reproduction of the data recorded at one of a plurality of positions. The level comparing means compares the average level outputted from the level detecting means with the level of the reproduced signal obtained by reproducing the data recorded at one position on the disk described above. When the average level is larger than the level of the reproduced signal of the data recorded at one position described above, judgment is made to the effect that a defect exists in the proximity of this one position.

The magnetic disk reproducing apparatus according to the present invention can detect and correct thermal asperity. Even when thermal asperity occurs, the magnetic disk reproducing apparatus corrects the reproduced signal and can correctly read out the data.

BRIEF DESCRIPTION OF THE DRAWINGS

The above object and features of the present invention will be more apparent from the following description of the preferred embodiments with reference to the accompanying drawings, wherein:

FIG. 35 is a flowchart useful for explaining the operation of the thirteenth embodiment of the present invention.

DESCRIPTION OF THE PREFERRED EMBODIMENTS

To begin with, the principle construction as the basis of preferred embodiments of the magnetic disk reproducing apparatus and a method or controlling the same according to the present invention will be explained with reference to FIGS. 7 and 8.

Figure 7:
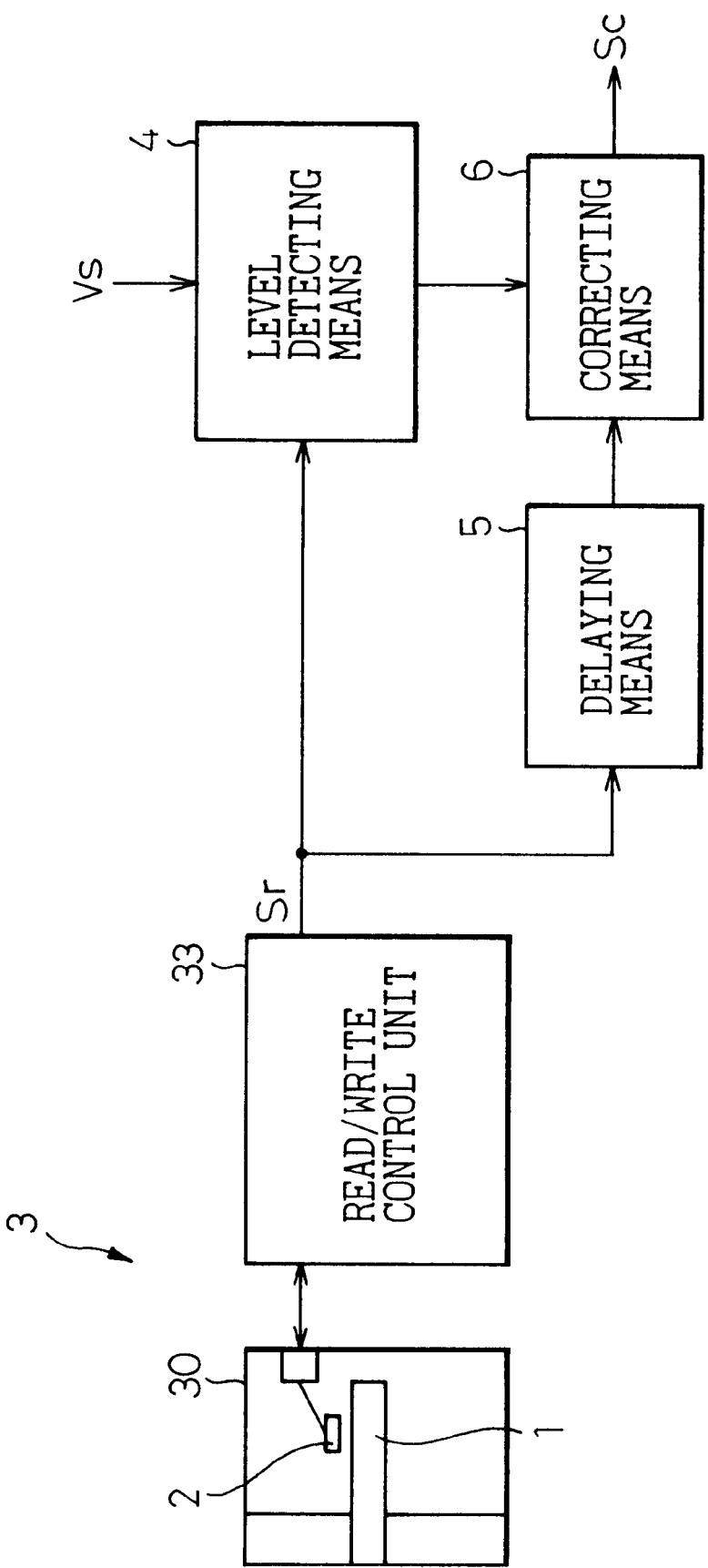
FIG. 7 is a block diagram showing the first principle construction of the present invention.

FIG. 7 is a block diagram showing the first principle construction of the present invention.

According to the first aspect (principle construction) of the present invention, there is provided a magnetic disk reproducing apparatus for reproducing data recorded at an arbitrary position on a rotating disk by a head. Such an apparatus includes level detecting means 4 for detecting a level of a DC component of a reproduced signal outputted from the head; delaying means 5 for delaying the reproduced signal by a predetermined value; and correcting means 6 for correcting the level of the DC component of the reproduced signal outputted from the delaying means 5 when the level of the DC component detected by the level detection means 4 is larger than a predetermined threshold level.

A controlling method of a magnetic disk reproducing apparatus according to the first principle construction of the present invention is a method of controlling the magnetic disk reproducing apparatus for reproducing data recorded at an arbitrary position on a rotating disk by a head. Such a method includes the steps of detecting a level of a DC component of a reproduced signal outputted from the head, delaying the reproduced signal by a predetermined value; and correcting the level of the DC component of the reproduced signal so delayed when the level of the detected DC component is larger than a predetermined threshold level.

Figure 8:
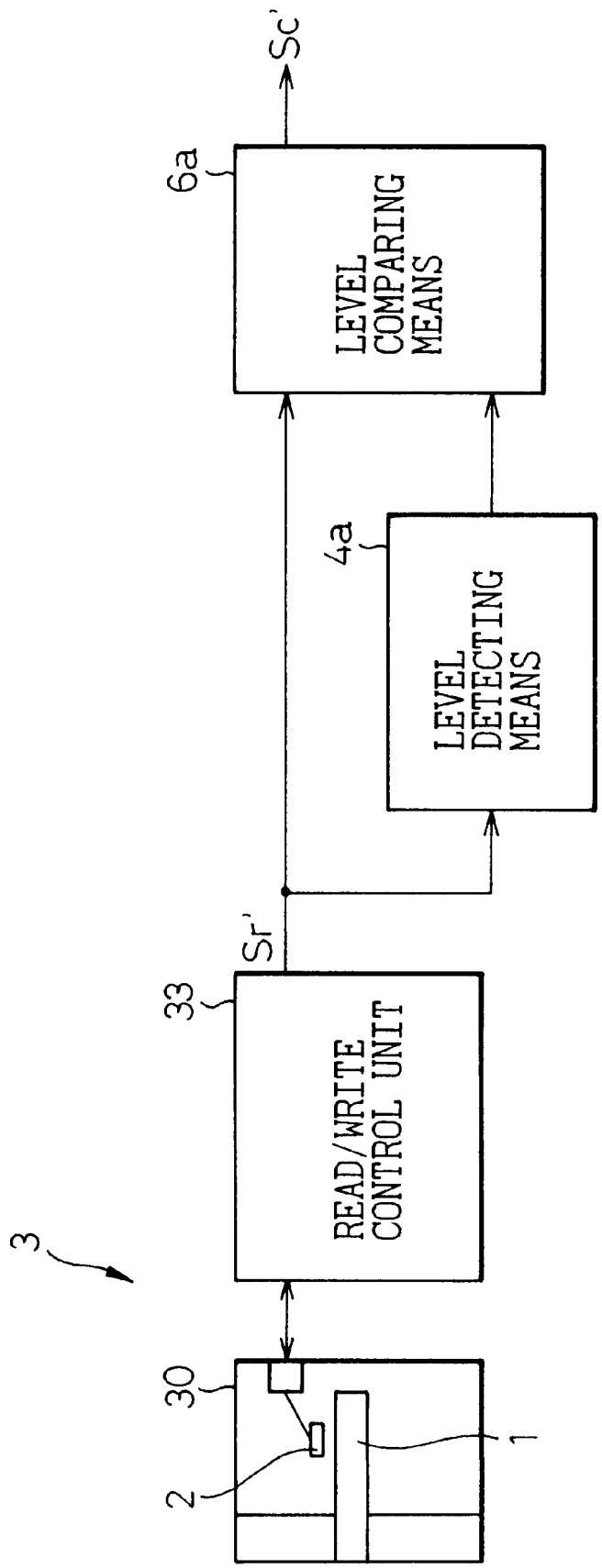
FIG. 8 is a block diagram showing the second principle construction of the present invention.

FIG. 8 is a block diagram showing the second principle construction of the present invention. By the way, like reference numerals will be hereinafter used to identify like constituents described above.

According to the second aspect (principle construction) of the present invention, there is provided a magnetic disk reproducing apparatus for reproducing data recorded at a plurality of positions on a rotating disk by a head. Such an apparatus includes level detecting means 4a for detecting an average level of reproduced signals outputted from the head until the lapse of a predetermined time from the time when the data recorded at one of a plurality of positions is reproduced; and level comparing means 6a for comparing the average level outputted from the level detecting means 4a with a level of a reproduced signal obtained by reproducing the data recorded at one position on the disk. The level comparing means 6a judges that a defect exists in the proximity of one position described above when the average level is larger than the level of the reproduced signal of the data recorded at one position described above.

A controlling method of a magnetic disk reproducing apparatus according to the second principle construction of the present invention is a method of controlling the magnetic disk reproducing apparatus for reproducing data recorded at a plurality of positions on a rotating disk by a head. Such a method includes the steps of detecting an average level of reproduced signals outputted from the head until the lapse of a predetermined time from the time when the data recorded at one of a plurality of positions is reproduced; comparing the average level so detected with a level of a reproduced signal obtained by reproducing the data recorded at one position on the disk; and judging that a defect exists in the proximity of one position described above when the average level is larger than the level of the reproduced signal of the data recorded at one position.

In FIGS. 7 and 8 described above, reference numeral 1 denotes a disk (magnetic disk medium); 2 a head (magnetoresistance effect type head; MR head); 3 a disk drive (magnetic disk reproducing apparatus); and 30 a disk mechanism portion.

As shown in FIG. 7, the first aspect of the magnetic disk reproducing apparatus according to the present invention reproduces data recorded at an arbitrary position on the disk 1 by the head 2, and the output (reproduced signal) of the head 2 is supplied to level detecting means 4 and to delaying means 5 (Sr) through a read/write control unit 33.

The level detecting means 4 detects the level of the DC component of the reproduced signal outputted from the head 2, and correcting means 6 corrects the level of the DC component of the reproduced signal outputted from the delaying means 5 when the level of the DC component detected by the level detecting means 4 is larger than a predetermined threshold level. Here, the delaying means 5 delays the reproduced signal by a predetermined value, and synchronizes the level detection of the reproduced signal by the level detecting means 4 with the correction of the reproduced signal by the correcting means 6.

The second aspect of the magnetic disk reproducing apparatus according to the present invention reproduces the data recorded at a plurality of positions on the rotating disk 1 by the head 2, as shown in FIG. 8, and the output (reproduced signal) of the head 2 is supplied to the level detecting means 4a and to the level comparing means 6a (Sr') through the read/write controlling unit 33.

The level detecting means 4a detects the average level of the reproduced signals outputted from the head 2 until the lapse of a predetermined time from the time when the data recorded at one of a plurality of positions is reproduced. The level comparing means 6a compares the average level outputted from the level detecting means 4a with the level of the reproduced signal obtained by reproducing the data recorded at one position on the disk 1. When the average level is larger than the level of the reproduced signal of the data recorded at one position described above, a defect is judged as existing in the proximity of this one position.

The first and second embodiments of the magnetic disk reproducing apparatuses of the present invention can detect and correct thermal asperity, and can read out correct data by correcting the reproduced signals even when thermal asperity occurs.

Hereinafter, the magnetic disk reproducing apparatus and the method of controlling the same according to the preferred embodiments of the present invention will be explained with reference to the accompanying drawings.

Figure 9:
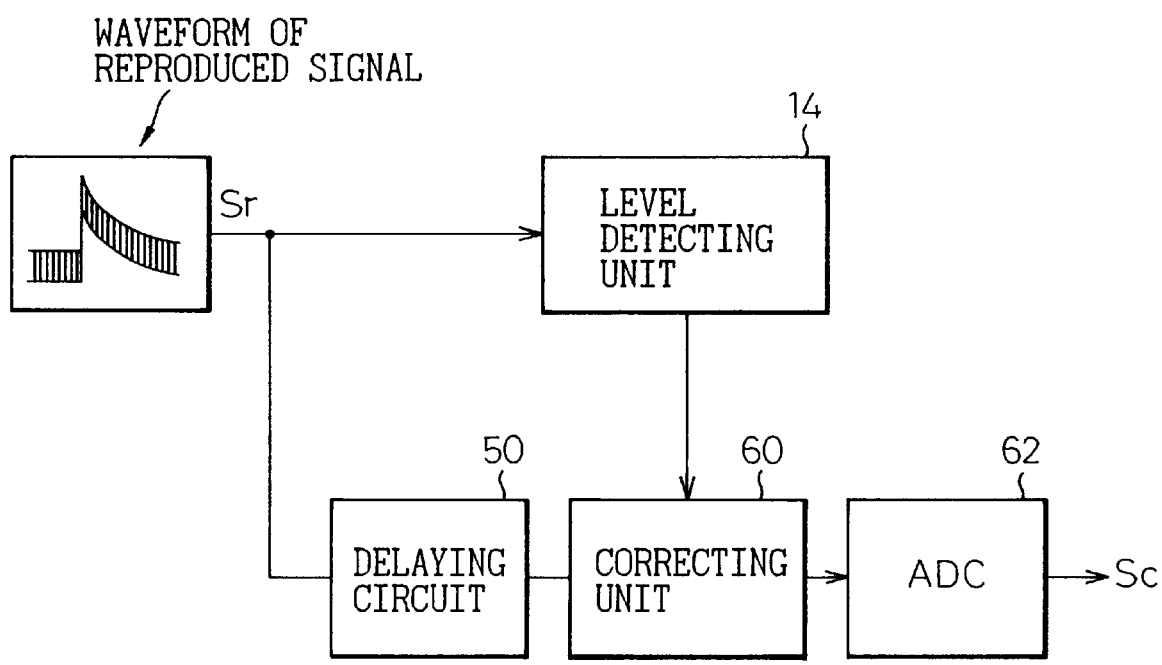
FIG. 9 is a block diagram showing the construction of the first embodiment of the present invention.

FIG. 9 is a block diagram showing the construction of the magnetic disk reproducing apparatus according to the first embodiment of the present invention. In the drawing, reference numeral 14 denotes a level detecting unit, 50 is a delaying circuit, 60 is a correcting unit, and 62 is an analog/digital converting unit (ADC).

In the first embodiment shown in FIG. 9, the level detecting unit 14 detects the level of the DC component of the analog reproduced signal (level change waveform due to thermal asperity) Sr outputted from the head (MR head). When the level of the DC component detected by the level detecting unit 14 is larger than a predetermined threshold level (for example, a level corresponding to a magnitude of approximately 1.5 times as large as the amplitude of the reproduced signal), the correcting unit 60 corrects the level of the DC component of the analog reproduced signal outputted from the delaying circuit 50. Here, the delaying circuit 50 delays the analog reproduced signal Sr by a predetermined value, and synchronizes the level detection of the reproduced signal Sr by the level detecting unit 14 with the correction of the reproduced signal Sr by the correcting unit 60. In other words, the reason why the delaying circuit 50 is disposed is that the timing must be aligned so as to correct the reproduced signal Sr by the correcting unit 60 after the level detecting unit 14 judges whether or not thermal asperity has occurred.

The analog/digital converting unit 62 converts the analog reproduced signal whose DC component level is corrected by the correcting unit 60 to a digital reproduced signal (Sc). As explained with reference to FIG. 7, the analog reproduced signal Sr is obtained by reproducing the data recorded at an arbitrary position on the rotating disk 1 by the head (MR head) 2, and is supplied to the level detecting unit 14 and to the delaying circuit 50 through the read/write controlling unit 33.

In the first embodiment shown in FIG. 9, each of the correction processes of the reproduced signals by the correcting unit 60 are effected as an analog process at a pre-stage portion of the analog/digital converting unit 62. By the way, the correction process of the reproduced signal having the level change due to thermal asperity will be later described in detail by using numerical formulas.

As described above, according to the first embodiment, it is possible to detect thermal asperity and to correct the waveform of the reproduced signal (correction of the DC level) resulting from this thermal asperity, by detecting the level of the DC component of the analog reproduced signal outputted from the head, delaying the analog reproduced signal by a predetermined value, correcting the level of the DC component of the analog reproduced signal so delayed when the level of the detected DC component becomes larger than a predetermined threshold level, and converting the analog reproduced signal whose DC component level is corrected to the digital reproduced signal. Therefore, even when thermal asperity occurs, the correct data can be read out by correcting the reproduced signal.

Figure 10:
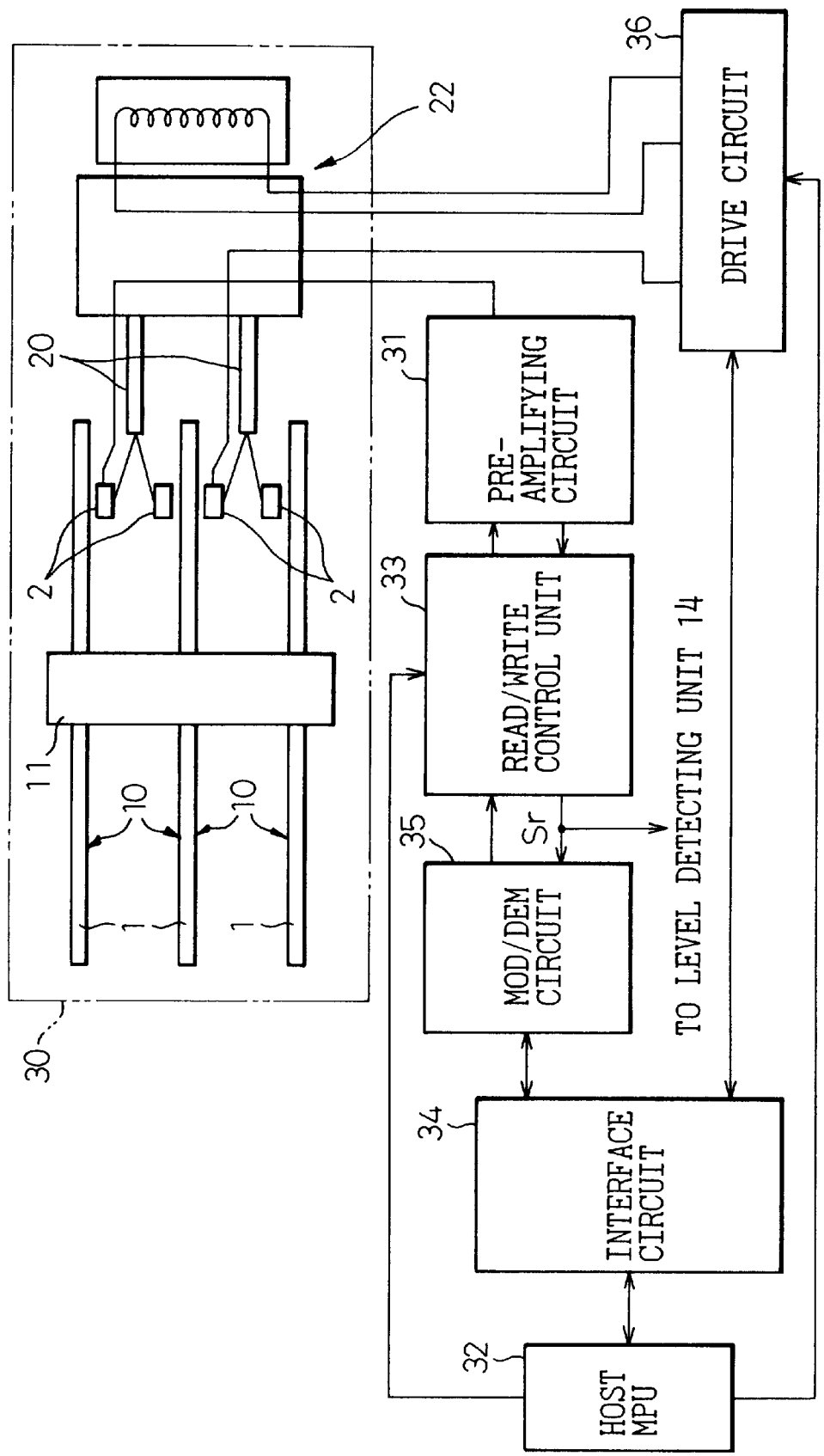
FIG. 10 is a schematic view showing a schematic construction of a disk drive used for the embodiment of the present invention.

FIG. 10 is a schematic view showing a schematic construction of the disk drive to which the embodiment of the present invention is applied. In the drawing, reference numeral 1 denotes the disk (magnetic disk medium); 2 the head; 10 the surface of the disk; 11 a spindle, 20 is a head supporting portion (actuator); 22 a carriage portion (voice coil motor: VCM); and 30 a disk mechanism portion.

As shown in FIG. 10, a plurality of disks 1 coupled with the spindle 11 and driven for rotation by a spindle motor (not shown) are coaxially provided to the disk mechanism portion 30. A servo surface is disposed on one of the surfaces of any of these magnetic disks, and the surfaces of the other magnetic disks are all the data surfaces.

A host MPU (microprocessor unit: host controller) 32 executes various controls inside the disk drive (magnetic disk reproducing apparatus) and executes also command and data controls between host apparatuses (hosts). The read/write control unit 33 executes read/write control of the data for the disk mechanism portion 30 on the basis of the instruction from the host MPU 32 through a pre-amplifying circuit (preamplifier) 31. Here, the reproduced signal Sr as the output of the read/write control unit 33 is supplied to the host MPU 32 through a modulation/demodulation circuit (mod/dem circuit) 35 and through an interface circuit 34. The reproduced signal Sr is also supplied to the level detecting unit 14 described above. By the way, the output signal (data signal) of the magnetic disk reproducing apparatus is outputted through the interface circuit 34.

Receiving a seek command from the host MPU 32, a drive circuit 36 drives and controls a carriage unit 22 and executes positioning control of the head 2 inside the disk mechanism portion 30.

Figure 1:
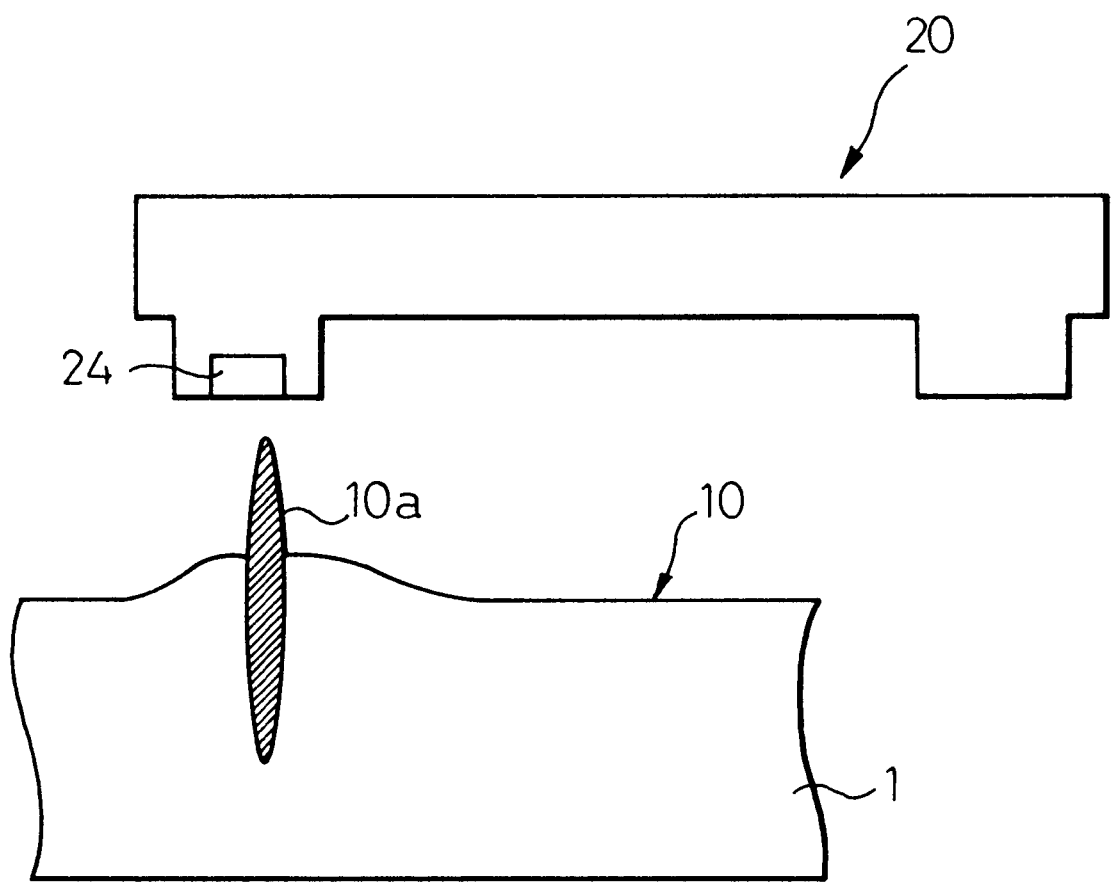
FIG. 1 is a schematic view useful for explaining thermal asperity that occurs when a magnetoresistance effect type head is used.
Figure 2:
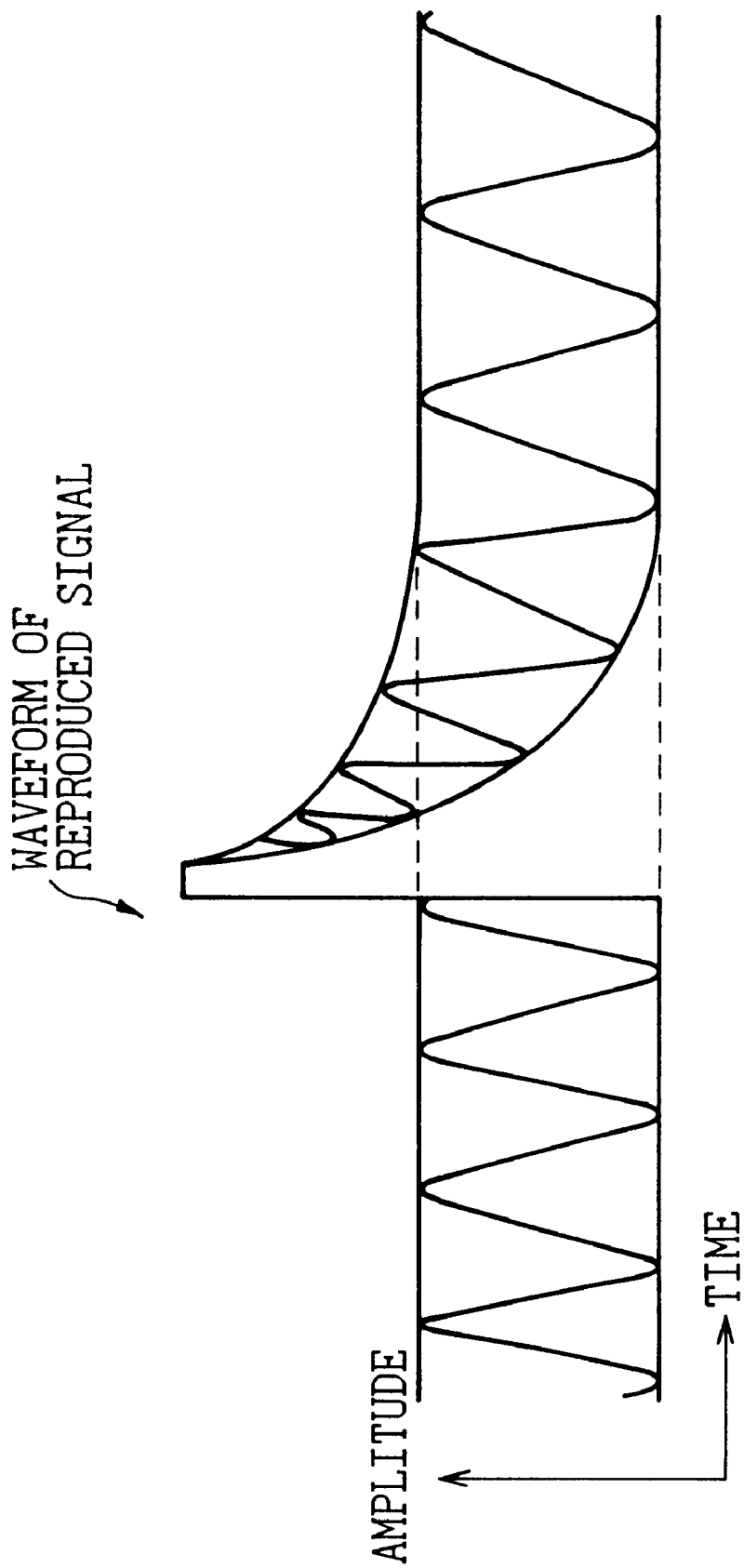
FIG. 2 is a signal waveform diagram showing the mode in which a DC level of a reproduced signal changes due to thermal asperity.
Figure 3:
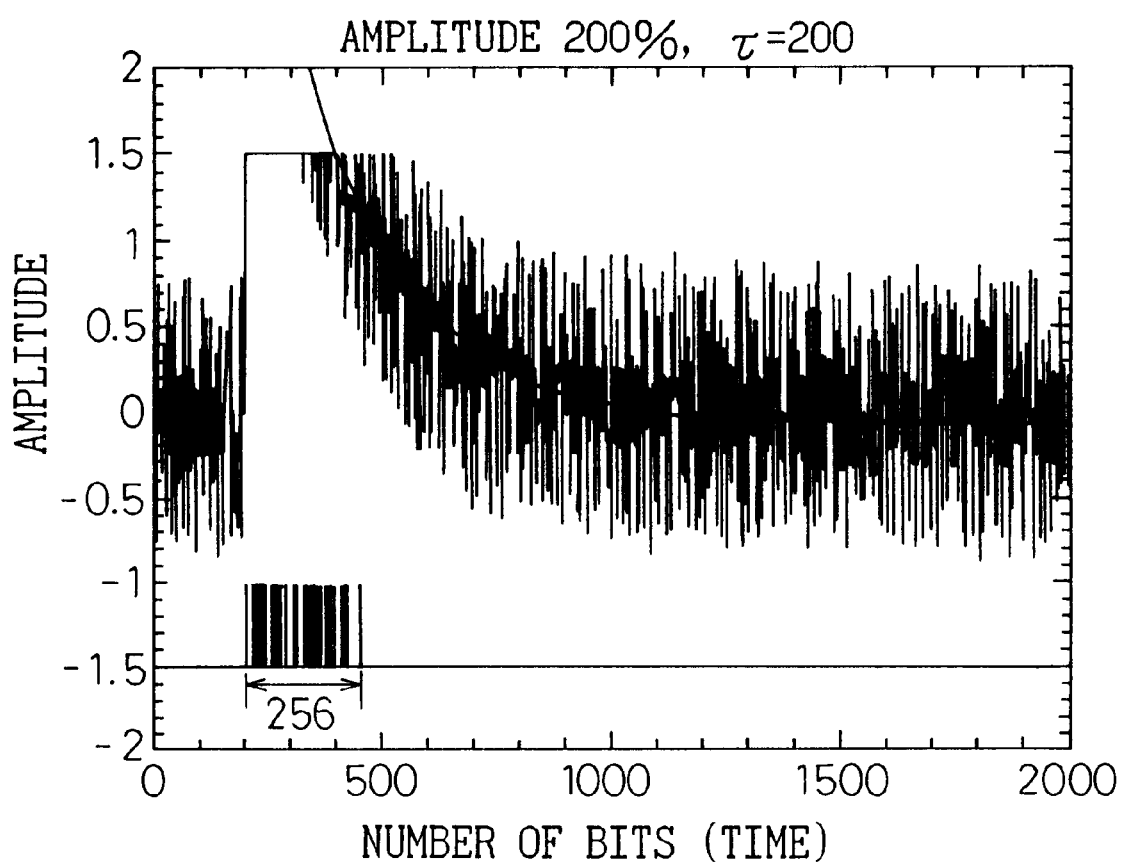
FIG. 3 is a signal waveform diagram showing the first example of a level change of a reproduced signal by a simulation technique when thermal asperity occurs.
Figure 4:
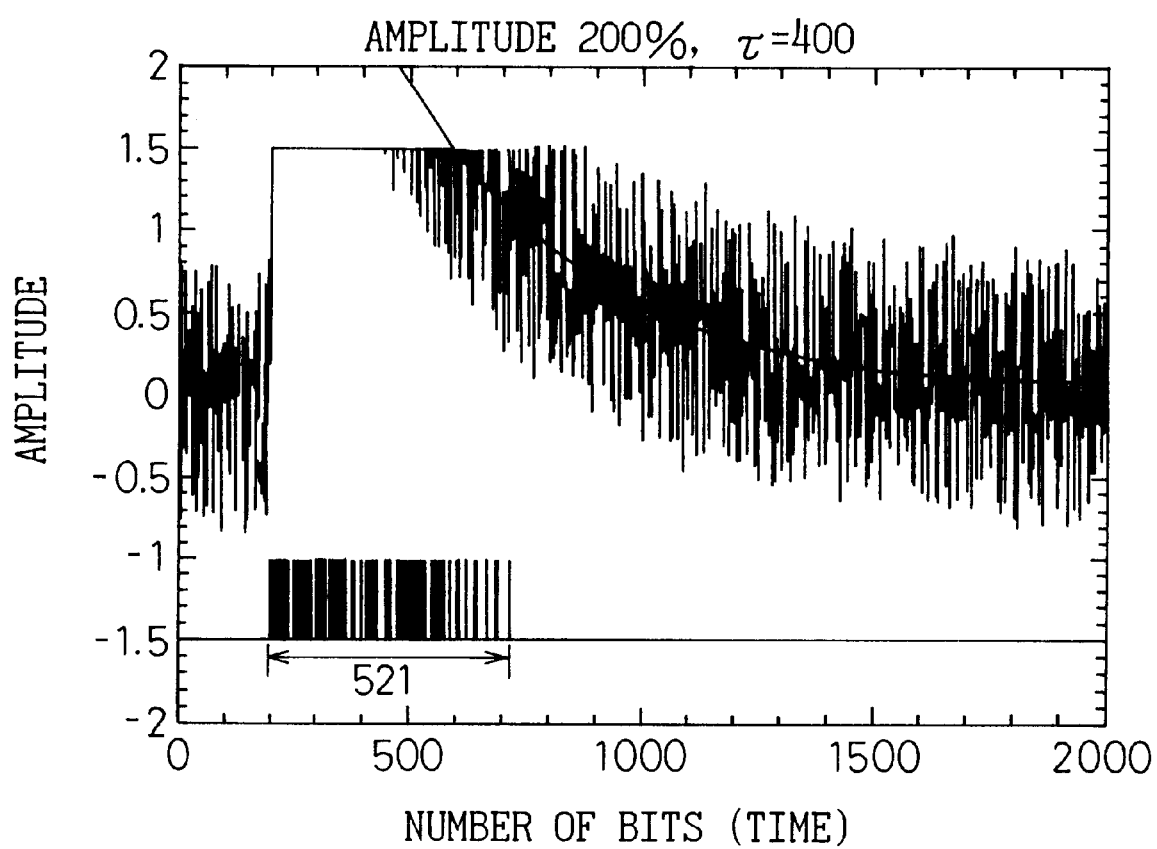
FIG. 4 is a signal waveform diagram showing the second example of the level change of the reproduced signal by a simulation technique when thermal asperity occurs.
Figure 5:
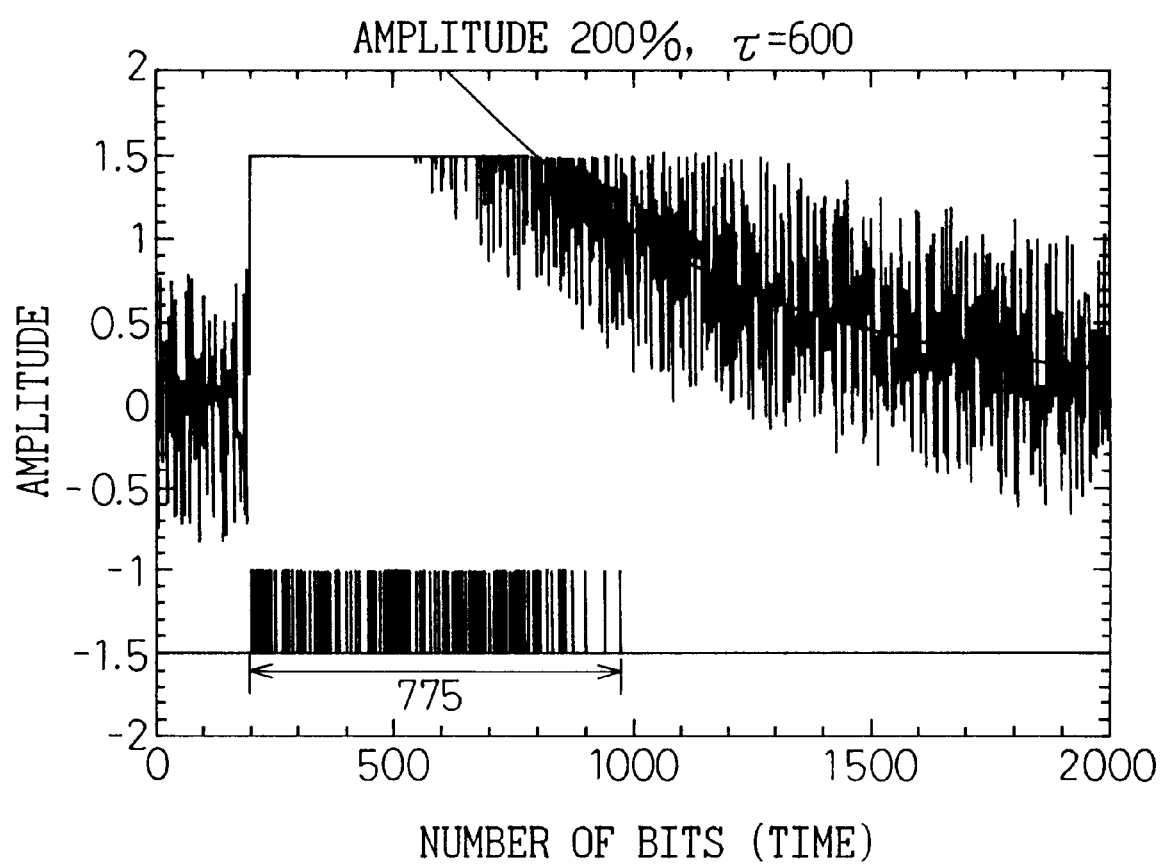
FIG. 5 is a signal waveform diagram showing the third example of the level change of the reproduced signal by a simulation technique when thermal asperity occurs.
Figure 6:
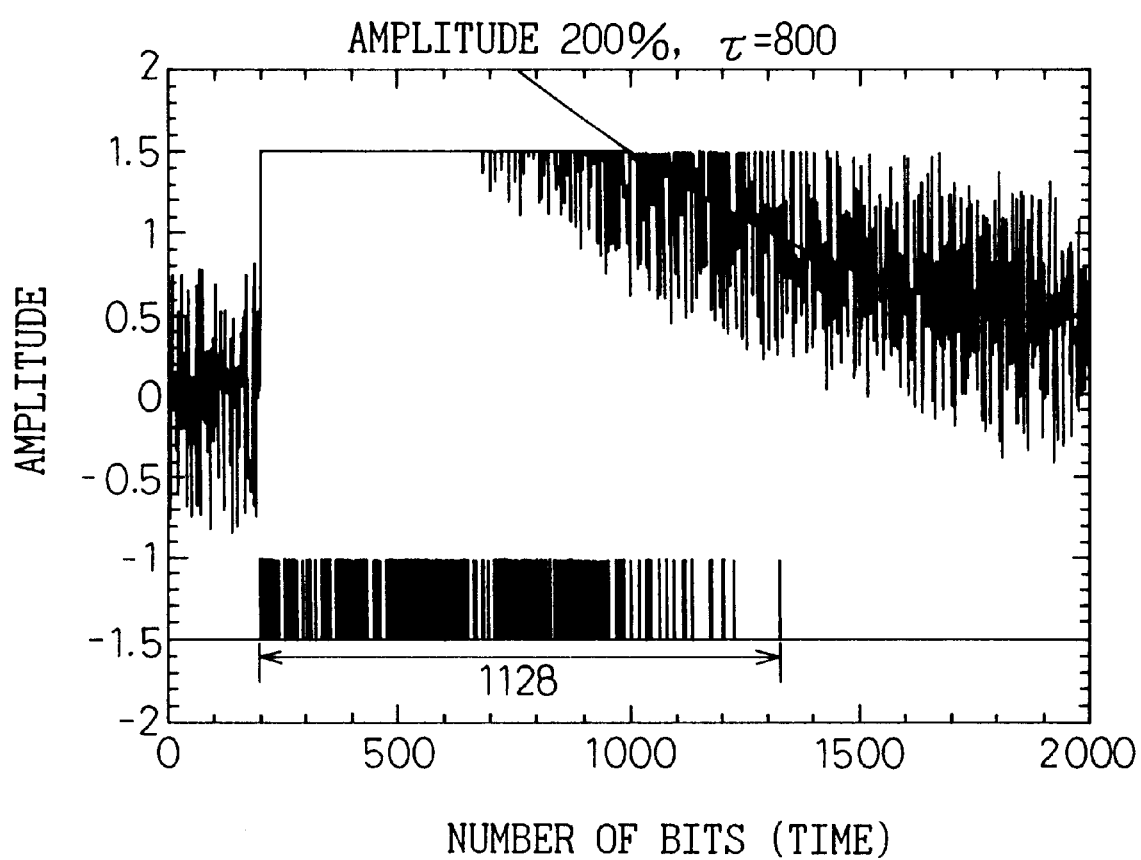
FIG. 6 is a signal waveform diagram showing the fourth example of the level change of the reproduced signal by a simulation technique when thermal asperity occurs.
Figure 11:
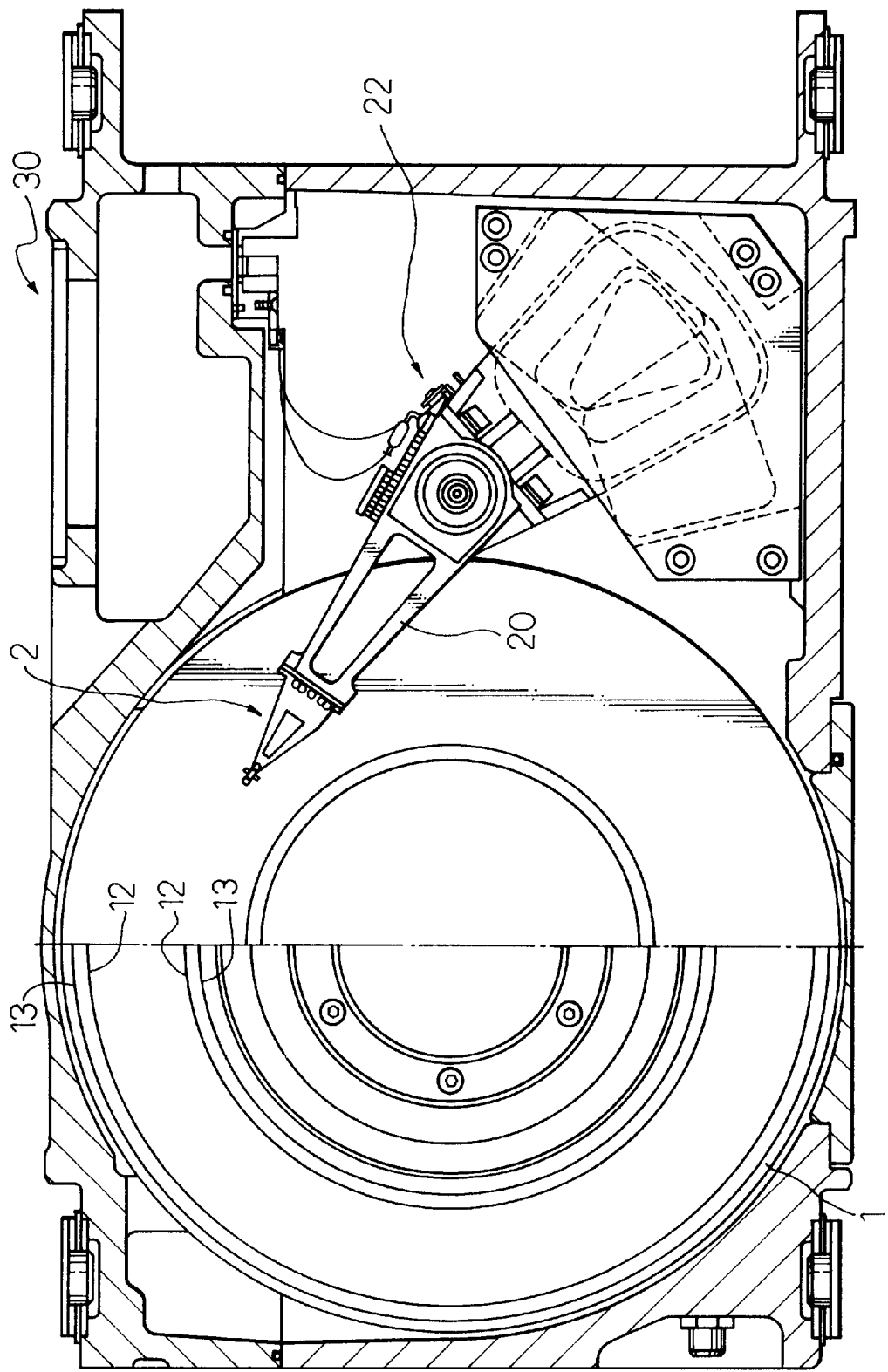
FIG. 11 is a plan view showing, partly in section, a disk mechanism portion of a disk drive applied to the embodiment of the present invention.

FIG. 11 is a plan view showing, partially in section, the disk mechanism portion 30 of the disk drive to which the embodiment of the present invention is applied. In the drawing, reference numeral 12 denotes guard bands, and reference numeral 13 denotes erase zones. As explained with reference to FIG. 4, the head 2 is disposed at the distal end of the head support unit (actuator) 22 controlled by the carriage unit (VCM) 22. The head 2 is equipped with the MR head for reproduction.

As shown in FIG. 11, a plurality of disks 1 (see FIG. 10) are simultaneously driven for rotation by the spindle motor, and a predetermined data pattern is written into tracks on the recording surface of each disk 1. Guard bands 12 to which a certain kind of specific patterns for stopping the seek operation of the head 2 are written in place of the data pattern into the tracks on both inner and outer end portions of the disk 1, for example. The erase zones 13 are formed on inside and outside these bands 12 so as to mechanically stop the head 2.

Figure 12:
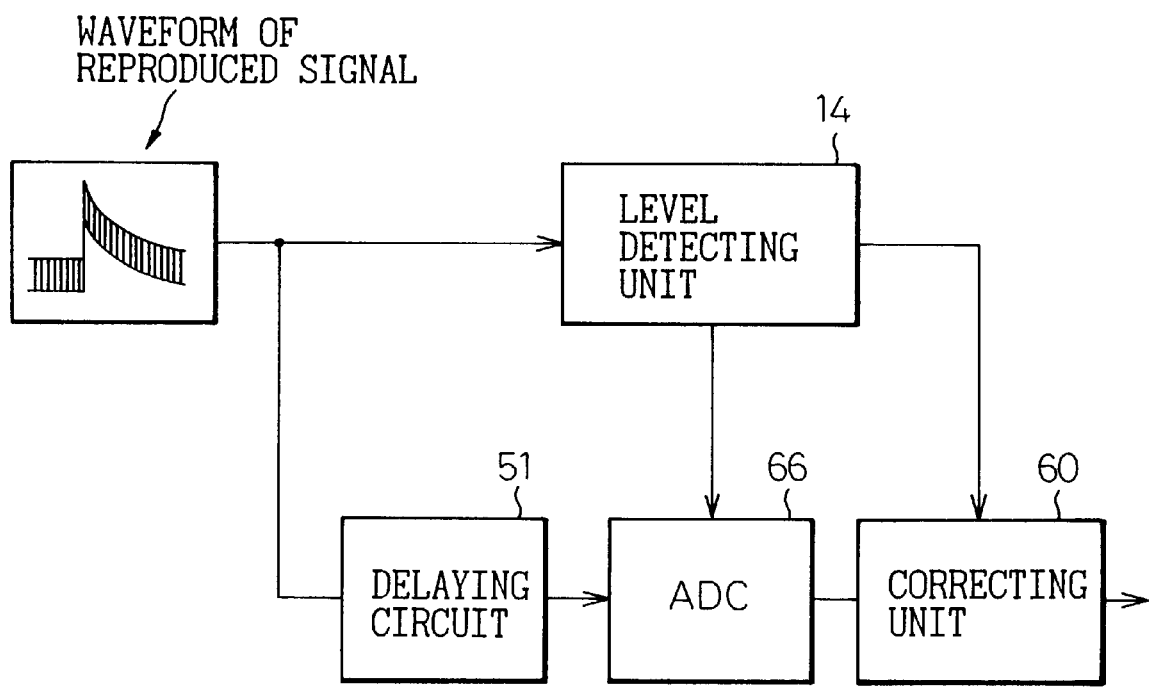
FIG. 12 is a block diagram showing the construction of the second embodiment of the present invention.

FIG. 12 is a block diagram showing the construction of the second embodiment of the present invention. In the drawing, reference numeral 14 denotes the level detecting unit, 51 is the delaying circuit, 60 is the correcting unit and 66 is the analog/digital converting unit (ADC).

As shown in FIG. 12, the level detecting unit 14 in the second embodiment detects the level of the DC component of the analog reproduced signal Sr outputted from the head, and the delaying circuit 51 delays the analog reproduced signal Sr by a predetermined value. The analog/digital converting unit 66 converts the analog detection signal, which represents the level of the DC component and is detected by the level detecting unit 14, and also the analog reproduced signal outputted from the delaying circuit 51, to the digital detection signal and to the digital reproduced signal, respectively, by using a sampling method.

The correcting unit 60 corrects the level of the DC component of the digital reproduced signal when the level of the DC component contained in the digital detection signal becomes larger than a predetermined threshold level.

The second embodiment shown in FIG. 12 adds the correcting unit 60 at the post-stage portion of the analog/digital converting unit 66 in the first embodiment shown in FIG. 9 so as to execute the correction process of thermal asperity for all the sampled and quantitized signals. The rest of the construction is the same as that of the first embodiment, and the magnetic disk reproducing apparatus of this second embodiment can correct the reproduced signal and can read out the correct data even when thermal asperity occurs. In other words, according to the second embodiment, it is possible to correct the reproduced signal and to read out the correct data even when thermal asperity occurs by detecting the level of the DC component of the analog reproduced signal outputted from the head, delaying the analog reproduced signal by a predetermined value, converting the analog detection signal representing the level of the DC component so detected and also the analog reproduced signal so delayed, to the digital detection signal and to the digital reproduced signal by sampling, respectively, and correcting the level of the DC component of the digital reproduced signal when the level of the DC component contained in the digital detection signal becomes larger than the predetermined threshold level.

Figure 13:
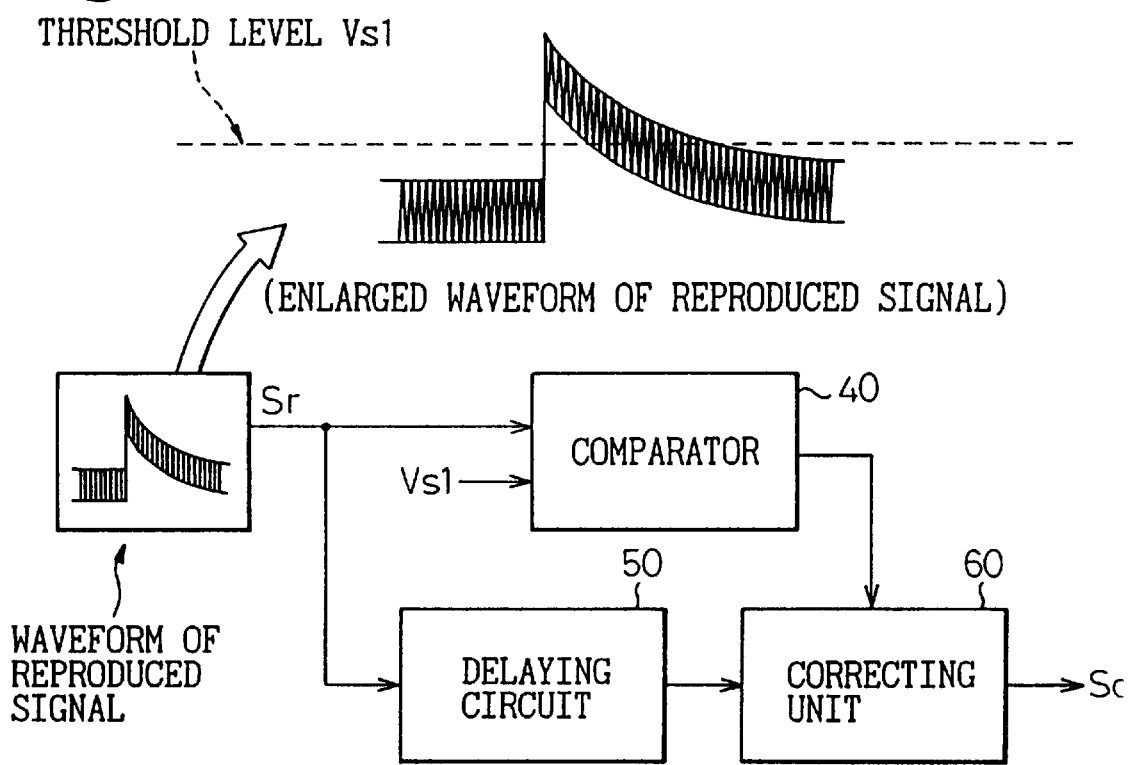
FIG. 13A is a block diagram showing the construction of the third embodiment of the present invention.
FIG. 13B is an enlarged diagram of the waveform shown in FIG. 13A.

FIG. 13A is a block diagram showing the construction of the third embodiment of the present invention. In the drawing, reference numeral 40 denotes a comparator (level detecting unit 14).

As shown in FIG. 13A, the third embodiment constitutes the level detecting unit 14 in the first or second embodiment described above as the comparator 40 for comparing the waveform of the reproduced signal Sr with the predetermined threshold level Vs1 (FIG. 13B). When the waveform of the reproduced signal Sr exceeds the threshold level Vs1, it reports to the correcting unit 60 that the level of the DC component of the reproduced signal Sr must be corrected.

In other words, as shown in FIGS. 13A and 13B, the third embodiment sets the threshold level Vs1, and the comparator 40 compares this threshold level Vs1 with the level of the reproduced waveform (waveform of the reproduced signal Sr). When the reproduced waveform exceeds the threshold level, for example, a high level "H" is outputted and when the former level does not exceeds the latter level, a low level L is outputted. In consequence, it is possible to judge that thermal asperity is detected when the output of the comparator 40 reaches the high level.

Figure 14:
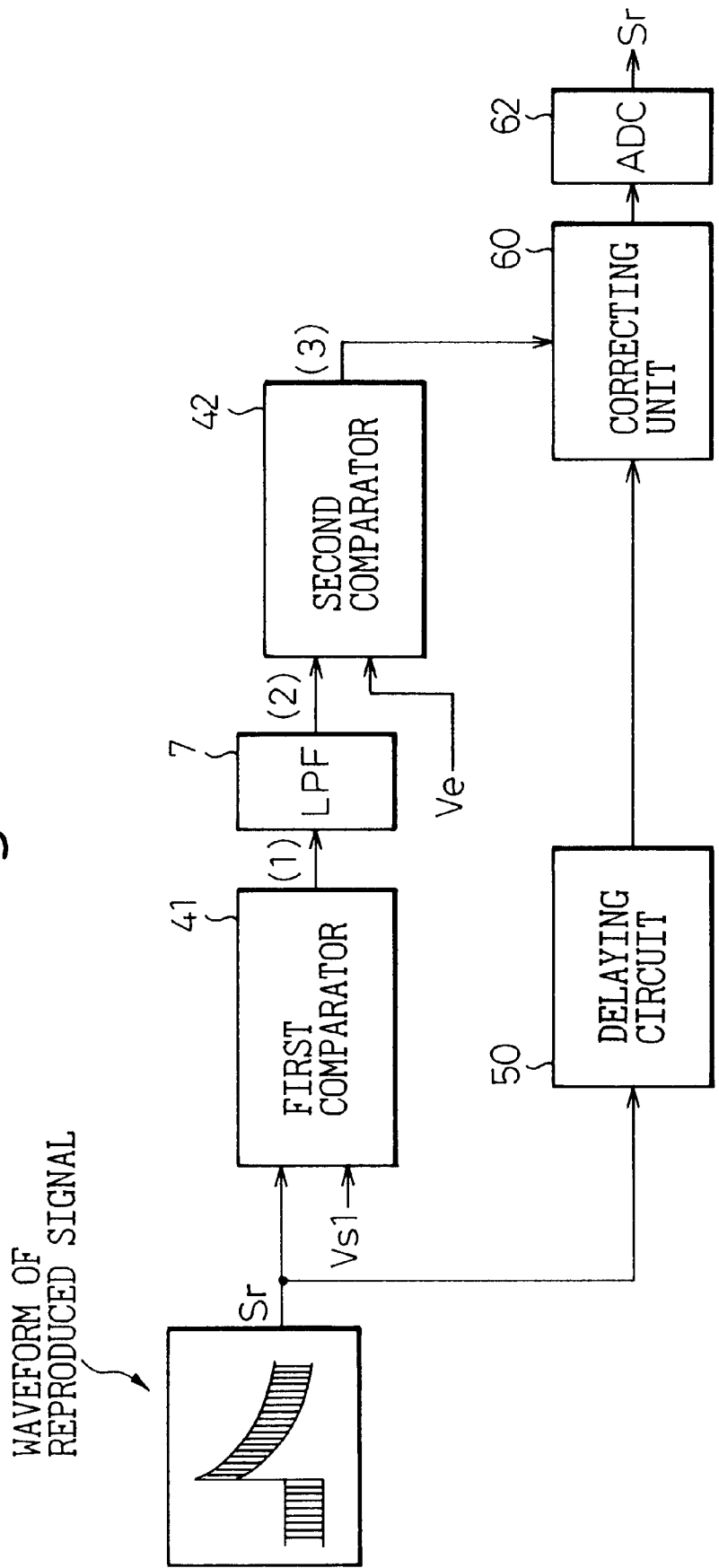
FIG. 14 is a block diagram showing the construction of the fourth embodiment of the present invention.

FIG. 14 is a block diagram showing the construction of the fourth embodiment of the present invention. In the drawing, reference numeral 7 denotes a low pass filter (LPF), reference 41 denotes a first comparator and reference numeral 42 denotes a second comparator.

As can clearly be seen by comparing FIG. 9 with FIG. 14, the fourth embodiment constitutes the level detecting unit 14 of the first embodiment by the first comparator 41, the low pass filter 7 and the second comparator 42. Here, the level detecting unit 14 having such a construction can be also applied to the second embodiment shown in FIG. 12.

This fourth embodiment detects the length of thermal asperity, that is, the length of the time affected by the occurrence of thermal asperity. In other words, when thermal asperity settles, the output of the comparator 40 of the third embodiment described above causes fluctuation between the high level "H" and the low level "L" because the read data component is hooked by the threshold (i.e., the read data component passes through the threshold). To eliminate such fluctuation, the fourth embodiment disposes the low pass filter 7 having a cutoff frequency lower than the signal frequency on the output side of the first comparator 41 and further disposes the second comparator 42 for further comparison with the predetermined threshold Ve.

Figure 15:
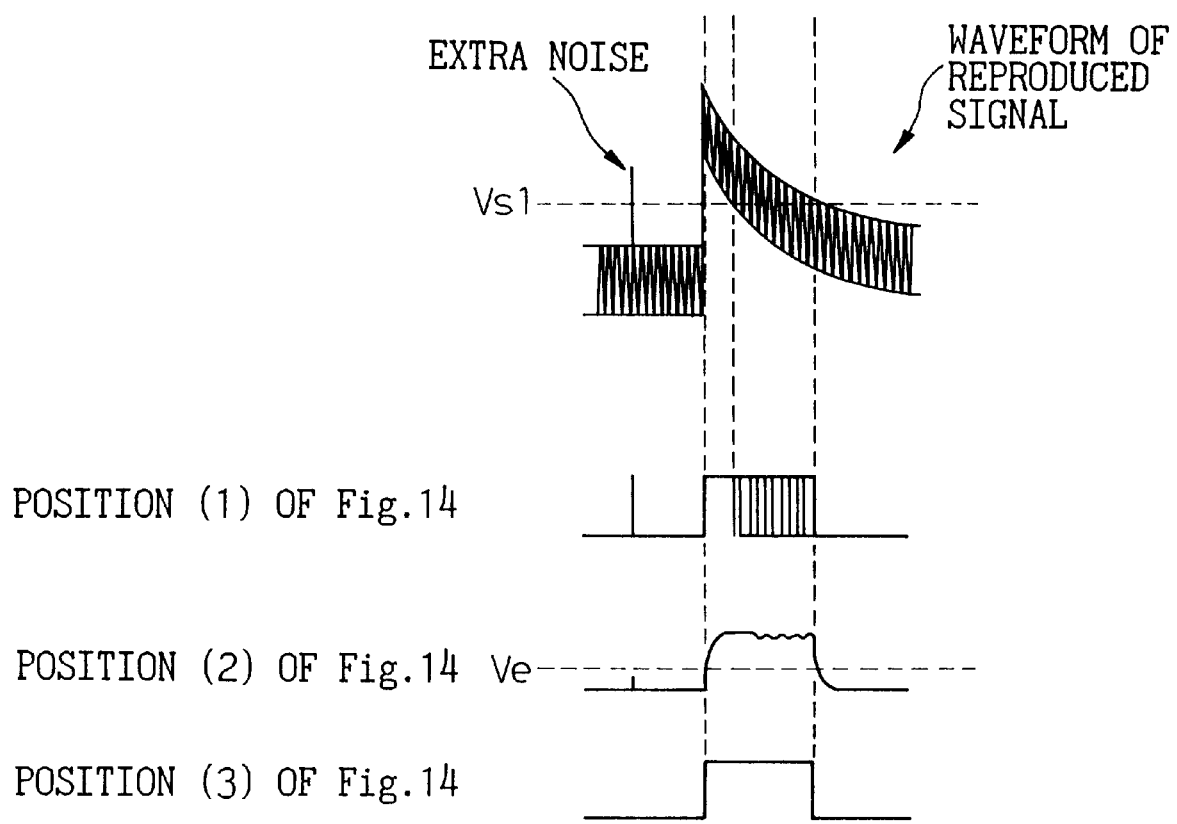
FIG. 15 is a signal waveform diagram showing a signal waveform at each portion in the fourth embodiment of the present invention.

FIG. 15 is a waveform diagram showing the signal waveform at each portion in the fourth embodiment of the present invention. This diagram altogether shows the output signal (1) (position (1) of FIG. 14) of the first comparator 41, the output signal (2) (position (2) of FIG. 14) and the output signal (3) (position (3) of FIG. 14) of the second comparator 42 that are shown in FIG. 14, together with the reproduced signal Sr. By the way, symbol Vs1 denotes a predetermined threshold level (for example, a level corresponding to a magnitude of 1.5 times as large as the amplitude of the ordinary reproduced signal).

As can be seen from FIG. 15, the data signal component can be eliminated by disposing the low pass filter 7. Furthermore, it is possible to know that the length of the high level "H" of the output is the length of thermal asperity, by comparing the output of the low pass filter 7 with another threshold level Ve set separately by the second comparator 42. Due to the effect of the low pass filter 7, the peak resulting from the extra noise other than thermal asperity can be eliminated, so that an erroneous operation can be prevented.

Figure 16:
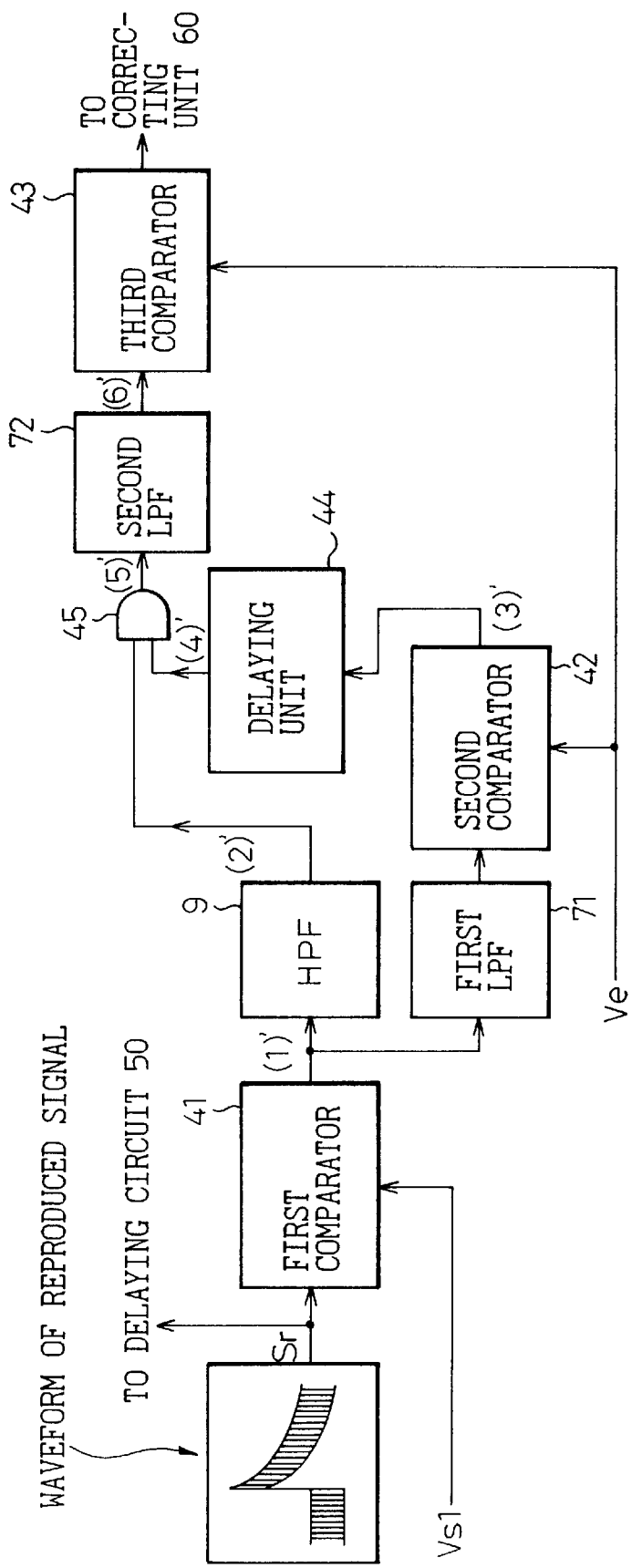
FIG. 16 is a block diagram showing the construction of the fifth embodiment of the present invention.
Figure 17:
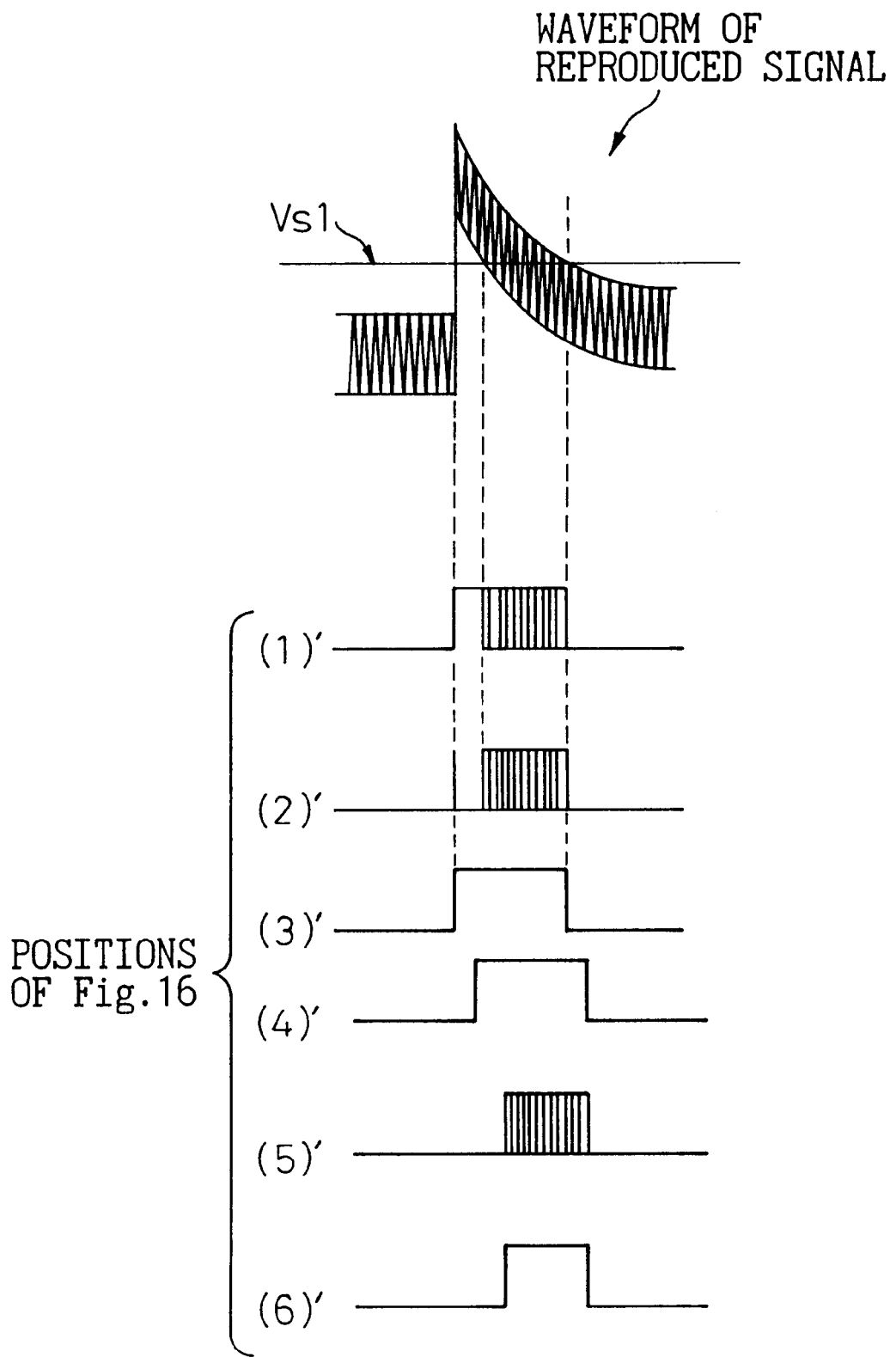
FIG. 17 is a signal waveform diagram showing a signal waveform at each portion in the fifth embodiment of the present invention.

FIG. 16 is a block diagram showing the construction of the fifth embodiment of the present invention, and FIG. 17 is a waveform diagram showing the signal waveform at each portion in the fifth embodiment. In FIG. 16, reference numeral 9 denotes a high pass filter (HPF), reference numeral 43 denotes a third comparator, reference numeral 44 denotes the delaying unit, reference numeral 45 denotes an AND gate, reference numeral 71 denotes a first low pass filter (LPF), and reference numeral 72 denotes a second low pas filter.

The fifth embodiment shown in FIG. 16 executes the correction process when a switching phenomenon as to whether the reproduced signal nearly exceeds the threshold level Vs1, or does not exceed this threshold level, occurs at a predetermined frequency and furthermore, when this switching phenomenon continues for a predetermined time. In other words, the AND gate 45 calculates a logical product between the output (2)' (position (2)' of FIG. 16)) of the high pass filter 9 representing that the switching phenomenon as to whether the reproduced signal Sr nearly exceeds the threshold level Vs1, or does not exceed this threshold level, occurs at a predetermined frequency or any other frequency higher than the predetermined frequency, and the output (3)' (position (3)' of FIG. 16)) of the second comparator 42 (output (4)' (position (4)' of FIG. 16) of the delaying unit 9) representing that this switching phenomenon continues for the time equal to or longer than a predetermined time. Further, the output (5)' (position (5)' of FIG. 16) of the AND gate 45 is used to control the correcting unit 60 through the second low pass filter 72 and the third comparator 43. Here, the second comparator 42 and the third comparator 43 compare the outputs of the first and second low pass filters 71 and 72 with the threshold level Ve, respectively.

Here, the output (5)' of the AND gate 45 is taken out only when the data signal component is judged as exceeding the threshold level, and the second low pass filter 72 and the third comparator 43 for comparison with the threshold level Ve are disposed to convert the state of the AND gate 45 during this period to the corresponding pulses. When it is judged by the third comparator 43 that the state in which the output (6)' (position (6)' of FIG. 16) of the low pass filter 72 is at the high level "H" continues for a certain time, it is judged that thermal asperity has occurred.

As described above, when the level fluctuation due to thermal asperity diminishes, the signal amplitude of the data is detected at the threshold level Vs1, and this fifth embodiment judges the asperity by judging this detection of the data.

Figure 18:
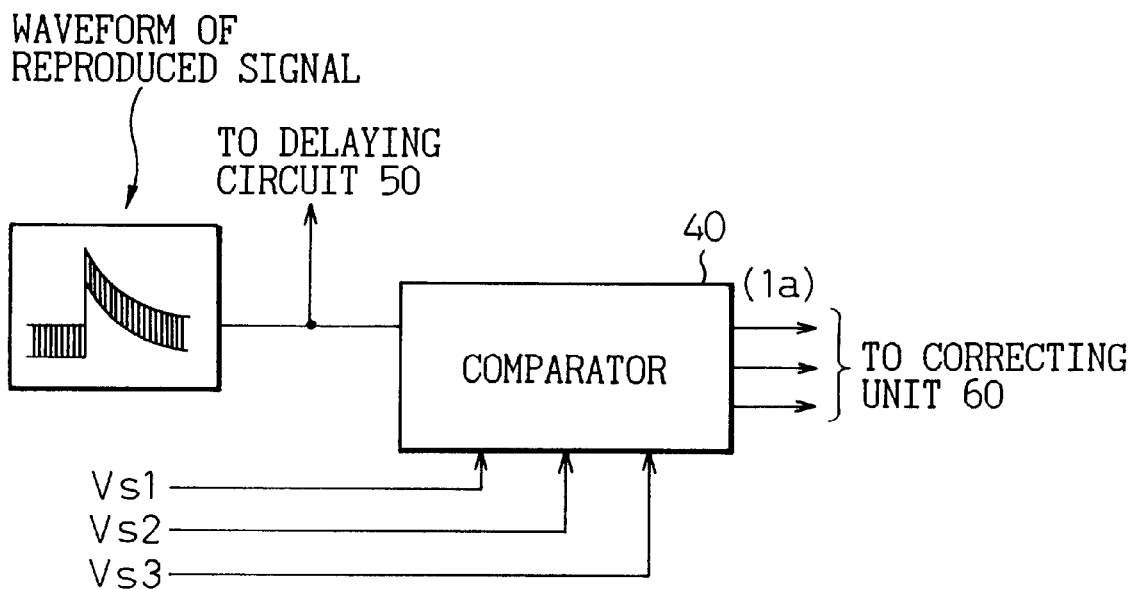
FIG. 18 is a block diagram showing the construction of the sixth embodiment of the present invention.
Figure 19:
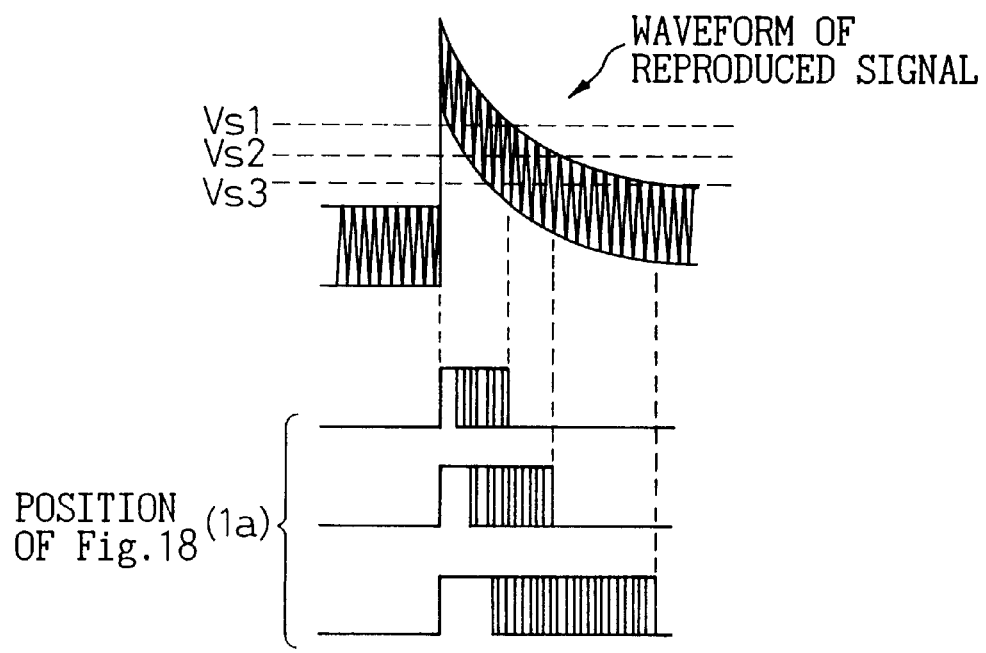
FIG. 19 is a waveform diagram showing an output signal waveform of a comparator in the sixth embodiment of the present invention.

FIG. 18 is a block diagram showing the construction of the sixth embodiment of the present invention, and FIG. 19 is a waveform diagram showing the output signal waveforms of the comparator in the sixth embodiment.

As can be seen from FIGS. 18 and 19, this sixth embodiments sets a plurality of threshold levels (Vs1) described above (Vs1 to Vs3 in this embodiment).

In other words, this sixth embodiment can correctly detect thermal asperity by setting a plurality of threshold levels (Vs1 to Vs3).

Here, thermal asperity exponentially attenuates until the signal returns to the original level, and when thermal asperity occurs as shown in FIG. 19, the level of the reproduced waveform exceeds the threshold level having a low level for a longer time. In this way, it is judged that thermal asperity has occurred.

Here, it is possible to keep the oscillation frequency of a variable frequency oscillator (VFO) fixed by stopping the clock of this VFO for the time which is a product obtained by multiplying the time in which the level of the reproduced signal exceeds one of a plurality of threshold levels by a predetermined constant. It is also possible to employ the construction in which the gain of an AGC circuit is fixed for the time which is a product of the time in which the level of the reproduced signal exceeds one of a plurality of threshold levels and a predetermined constant.

Figure 20:
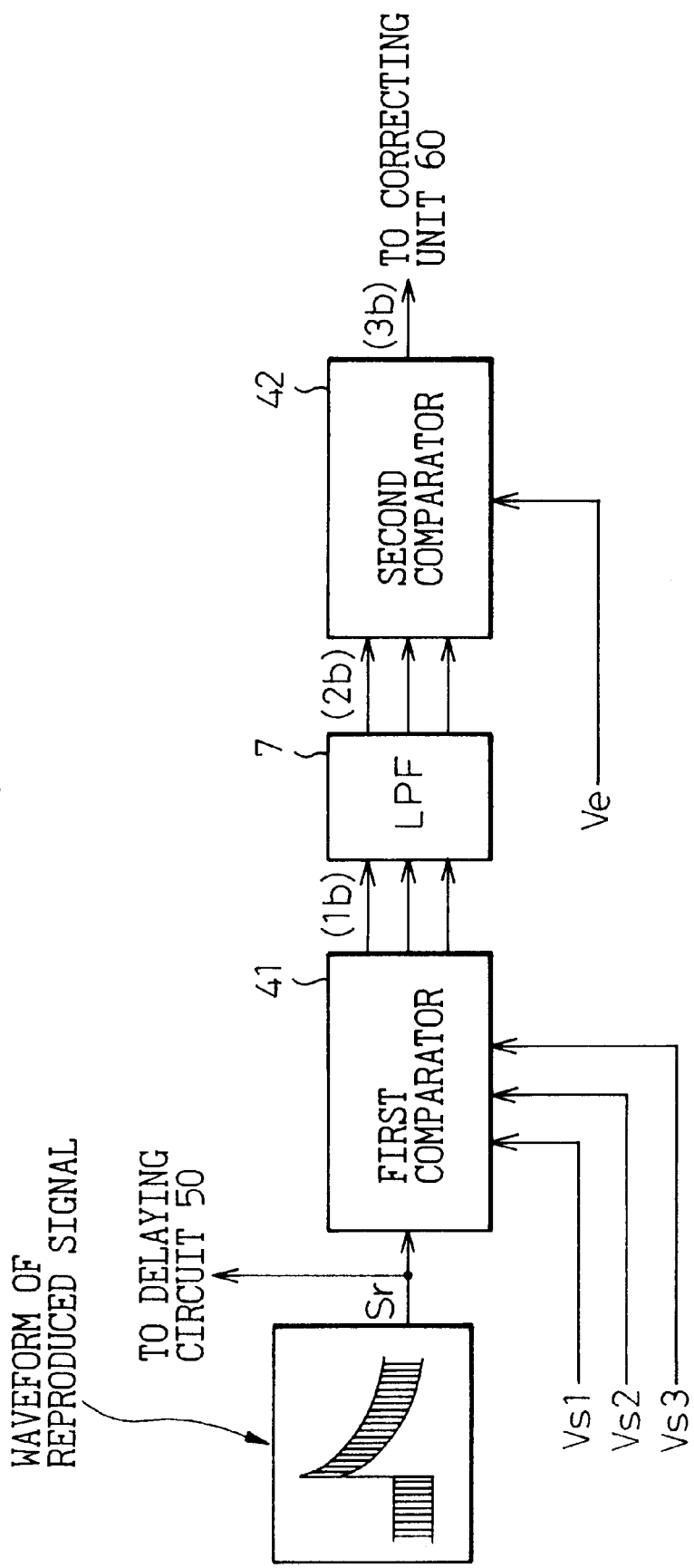
FIG. 20 is a block diagram showing the construction of the seventh embodiment of the present invention.
Figure 21:
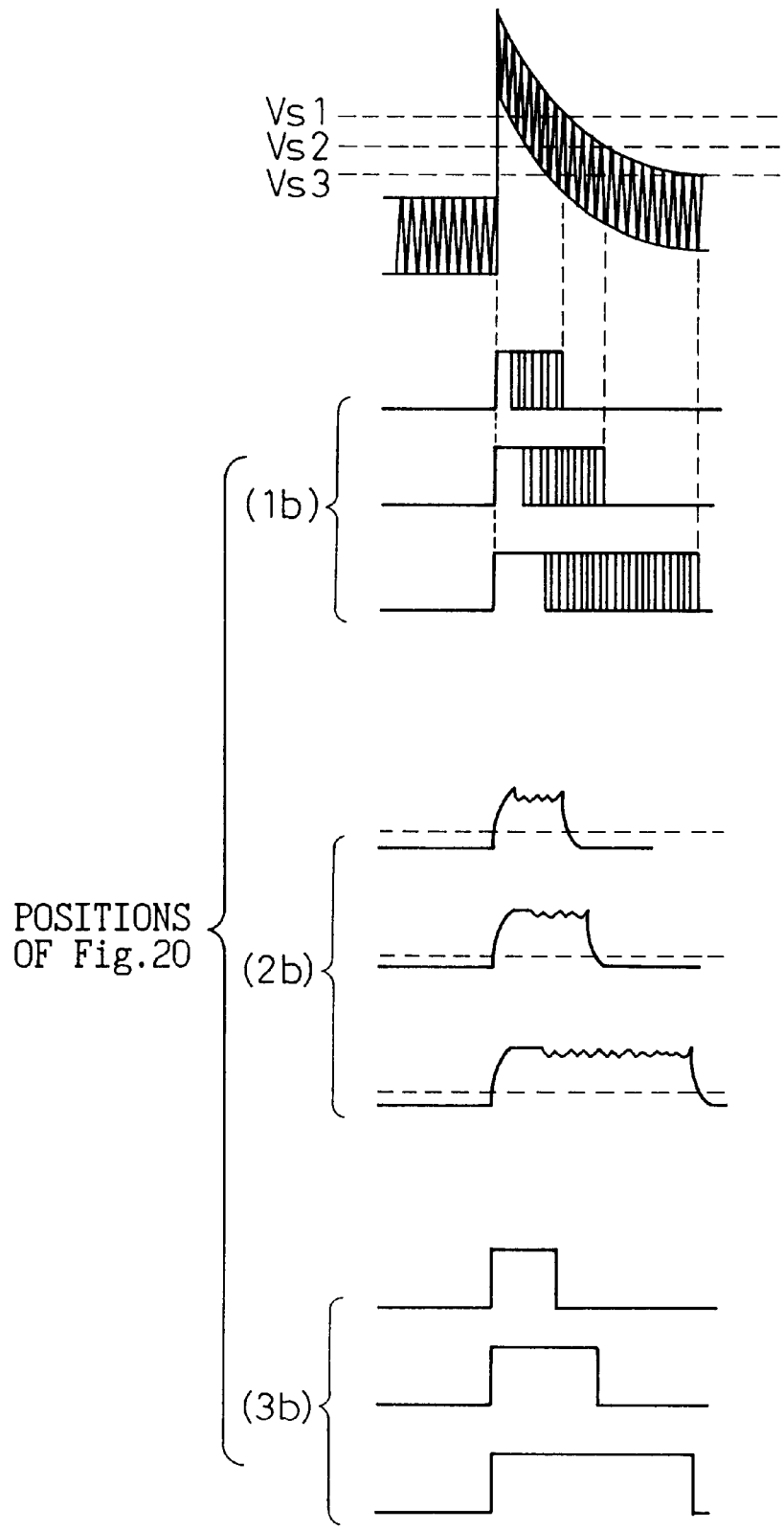
FIG. 21 is a block diagram showing an operation waveform of each portion in the seventh embodiment of the present invention.

FIG. 20 is a block diagram showing the construction of the seventh embodiment of the present invention, and FIG. 21 is a block diagram showing the operation waveform at each portion in the seventh embodiment.

As shown in FIGS. 20 and 21 (refer also to the fourth embodiment shown in FIGS. 14 and 15), this seventh embodiment sets a plurality of threshold levels (Vs1 to Vs3) and compares the signal passed through the low pass filter 7 with other threshold levels Ve.

In FIG. 21, the output (1b) (position (1b) of FIG. 20) of the first comparator 41, the output (2b) (position (2b) of FIG. 20) of the low pass filter 7 and the output (3b) (position (3b) of FIG. 20) of the second comparator 42 correspond to the outputs (1), (2) and (3) in FIG. 15, respectively.

In this way, this seventh embodiment sets a plurality of threshold levels and judges that thermal asperity occurs, when the time periods t1, t2 and t3 in which the signal level exceeds the threshold levels Vs1, Vs2 and Vs3, respectively, are expressed as t1<t2<t3.

Here, it is possible to employ the construction wherein the clocks of the VFO are extracted in such a manner as to correspond to the low level "L" and the high level "L" of the output signals of the comparator, or the construction in which the oscillation frequency of the VFO is fixed. Further, the gain of the AGC circuit may be made variable or may be fixed in accordance with the low level "L" and the high level "H" of the output signals of the comparator.

Figure 22:
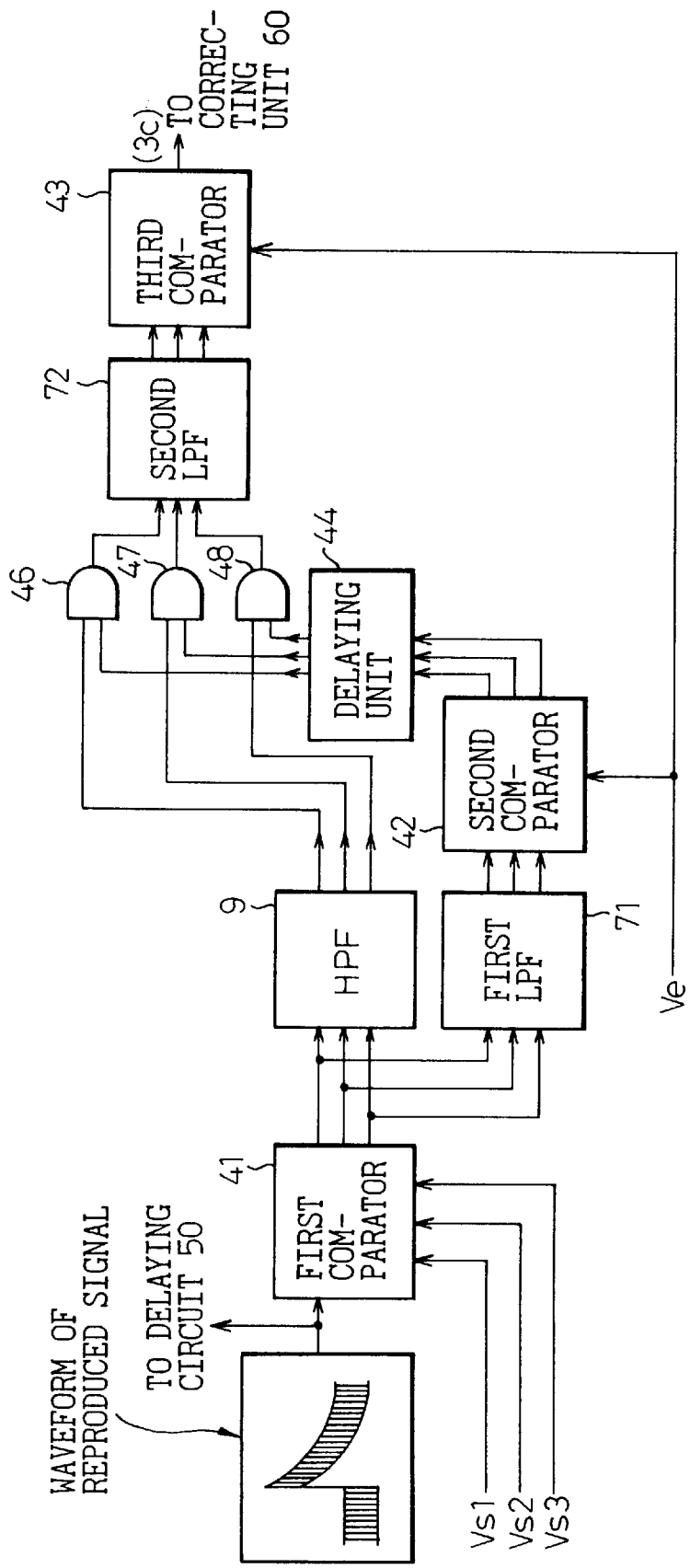
FIG. 22 is a block diagram showing the construction of the eighth embodiment of the present invention.
Figure 23:
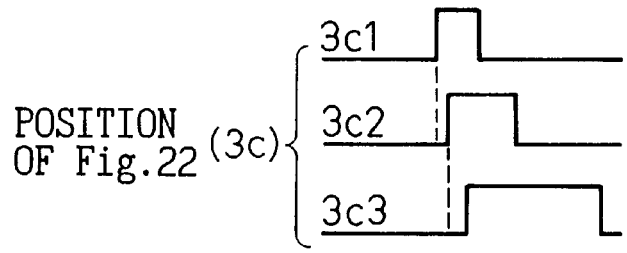
FIG. 23 is a waveform diagram showing an output signal waveform of a third comparator in the eighth embodiment of the present invention.

FIG. 22 is a block diagram showing the construction of the eighth embodiment of the present invention, and FIG. 23 is a waveform diagram showing the output signal waveforms of the third comparator in the eight embodiment of the present invention.

As shown in FIGS. 22 and 23 (refer also to the fifth embodiment shown in FIGS. 16 and 17), this eighth embodiment sets a plurality of threshold levels (Vs1 to Vs3), and executes a correction of the reproduced signal when the switching phenomenon as to whether the signal level nearly exceeds each threshold level Vs1 to Vs3, or does not exceed this threshold level, occurs at a predetermined frequency or any other frequency higher than the predetermined frequency and furthermore, when this switching phenomenon continues for the time equal to or longer than a predetermined time. In other words, this eighth embodiment sets a plurality of threshold levels and executes the above correction at a predetermined frequency or any other frequency higher than the predetermined frequency.

More concretely, when three threshold levels (Vs1 to Vs3) are set, the output 3c (3c1 to 3c3) of the third comparator 43 (i.e., position (3c) of FIG. 22) becomes such as shown in FIG. 23. This eighth embodiment compares the time periods tc1, tc2 and tc3 in which the outputs 3c1 to 3c3 reach the high level "H", respectively, with each other and judges that thermal asperity occurs when the relation tc1<tc2<tc3 is established with the differences of the time periods exceeding predetermined values among the three time periods. Here, the outputs (3c1 to 3c3) of the third comparator 43 correspond to the cases in which the threshold levels are Vs1 to Vs3, respectively.

Figure 24:
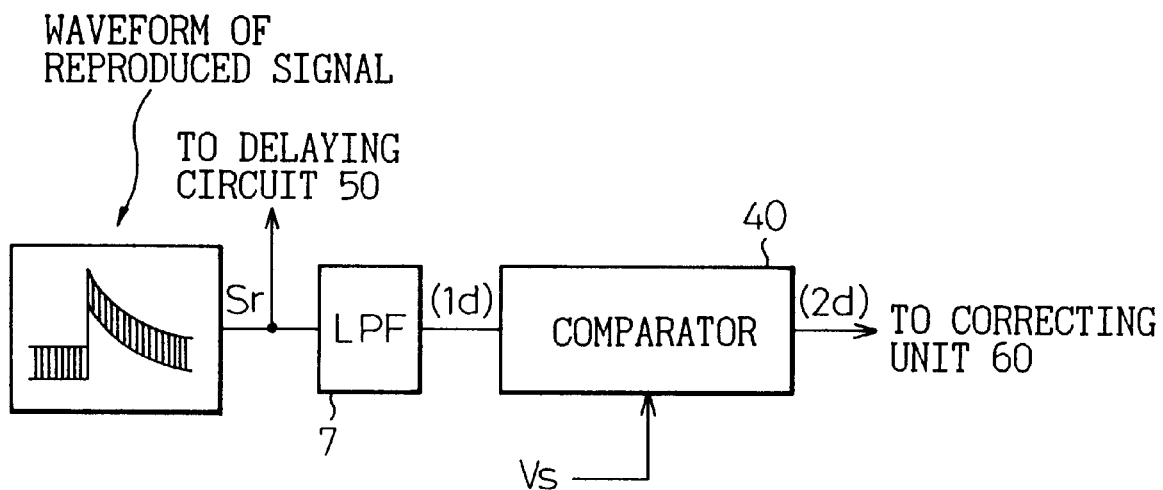
FIG. 24 is a block diagram showing the construction of the ninth embodiment of the present invention.
Figure 25:
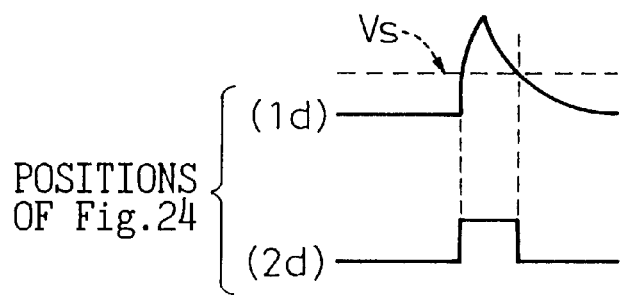
FIG. 25 is a waveform diagram showing a signal waveform of each portion in the ninth embodiment of the present invention.

FIG. 24 is a block diagram showing the construction of the ninth embodiment of the present invention, and FIG. 25 is a waveform diagram showing the signal waveform at each portion in the ninth embodiment of the present invention.

As shown in FIG. 24, this ninth embodiment passes the analog reproduced waveform (reproduced signal Sr) through the low pass filter 7, sets the threshold level Vs for the low pass filter output (Id), and executes a correction of the reproduced signal when the signal level exceeds this threshold level Vs for the time equal to or longer than a predetermined time. Here, the cutoff frequency of the low pass filter 7 is set to a value capable of eliminating the data signal component. Therefore, when thermal asperity exists, the output (1d) of the low pass filter takes the form shown in FIG. 25. In this ninth embodiment, the output (1d) of the low pass filter 7 and the threshold level Vs are compared by the comparator 40, and thermal asperity is judged as occurring when the output exceeds the threshold level Vs (refer to the position (2d) in FIG. 24 or FIG. 25).

Figure 26:
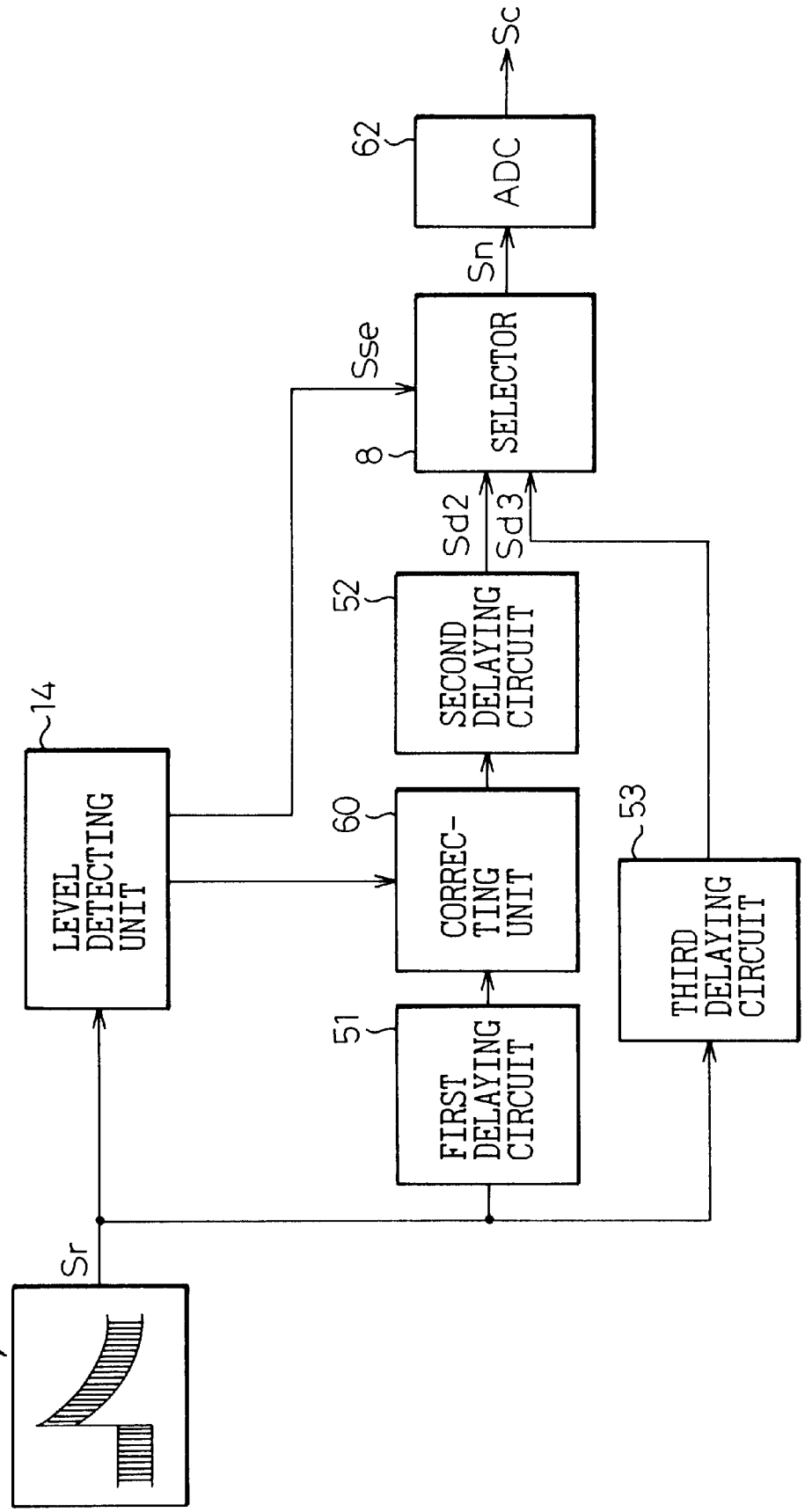
FIG. 26 is a block diagram showing the construction of the tenth embodiment of the present invention.

FIG. 26 is a block diagram showing the construction of the tenth embodiment of the present invention. In this drawing, reference numeral 8 denotes a selector.

In the tenth embodiment shown in FIG. 26, the reproduced signal Sr is supplied to the level detecting unit 14, the first delaying circuit 51 and the third delaying circuit 53. The output of the first delaying circuit 51 is supplied to the correcting unit 60. When the level detecting unit 14 judges thermal asperity (refer, for example, to the first embodiment shown in FIG. 9), the correcting unit 60 corrects the level of the DC component of the reproduced signal Sr. The output of this correcting unit is supplied to the second delaying circuit 52, and the output (Sd2) of the second delaying circuit 52 is supplied to the selector 8. The output (Sd3) of the third delaying circuit 53, too, is supplied to the selector 8. The output Sse of the level correcting unit 14 is supplied to the selector 8, and the correcting unit 60 corrects the level of the DC component. One of the reproduced signal (Sd2)

and the reproduced signal (Sd3), which is merely delayed by the third delaying circuit 53, is selected (Sn) and is outputted as the digital signal (Sc) through the analog/digital converting unit 62.

In other words, in this tenth embodiment, when the reproduced signal exceeds the threshold level in the level detecting unit, it is corrected by the correcting unit 60. When the level detecting unit 14 thereafter judges that the reproduced signal is not thermal asperity, the selector 8 selects the data signal Sd3 flowing through the third delaying circuit 53. Here, the third delaying circuit 53 is used for returning the state to the start when the correcting unit 60 starts the correction process even though the level detecting unit 14 does not judge the state as thermal asperity. The second delaying circuit 52 is used for aligning the timings of all the signals.

As described above, this tenth embodiment outputs the corrected reproduced signal by the selector 8 only when thermal asperity exists. In this way, unnecessary correction can be eliminated after thermal asperity is erroneously detected.

Figure 27:
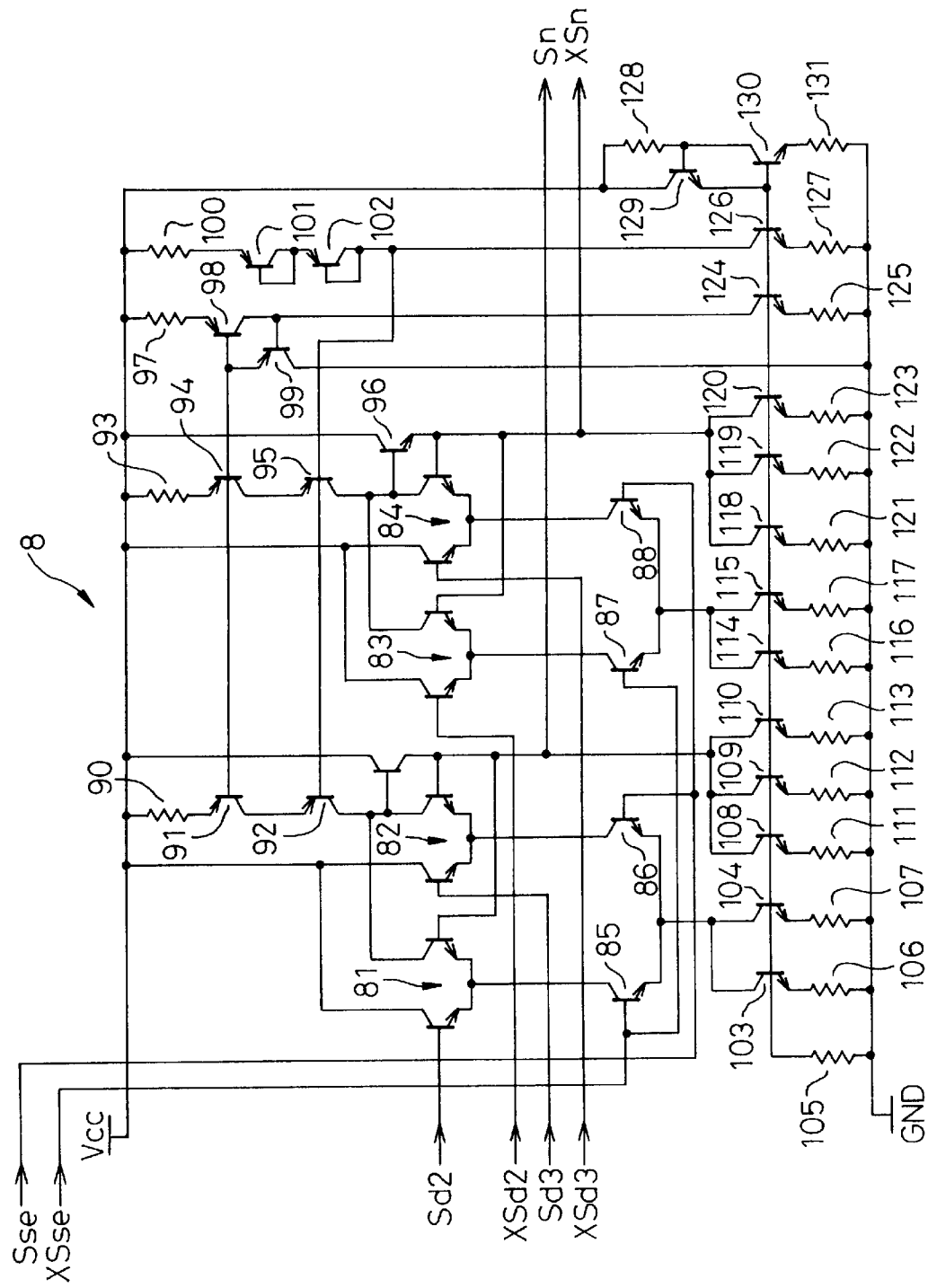
FIG. 27 is a circuit diagram showing a structural example of a selector in FIG. 26.

FIG. 27 is a circuit diagram showing one structural example of the selector shown in FIG. 26. As shown in FIG. 27, the selector 8 employs a differential construction comprising a plurality of bipolar transistors (81 to 88, 91, 92, 94, 95, . . . , 126, 129, and 130) and a plurality of resistors (90, 93, 97, . . . , 127, 128, and 131).

In other words, as can be clearly appreciated by comparing FIG. 26 with FIG. 27, the signals in the selector 8 shown in FIG. 27 have the differential construction (complementary signals), and the affix X to the head of the positive phase signal represents the opposite phase signal. Therefore, the complementary outputs (Sd2) and (XSd2) of the second delaying circuit, the complementary outputs (Sd3) and (XSd3) and the complementary outputs (Sse) and (XSse) of the level detecting unit 14 are supplied to the selector 8 shown in FIG. 27, and the selector 8 outputs the complementary signals Sn and XSn. Here, the outputs (Sse) and (XSse) of the level detecting unit 14 are the selection control signals, and the outputs (SD2) and (XSd2) of the second delaying circuit or the outputs (Sd3) and (XSd3) of the third delaying circuit are outputted as the outputs (Sn) and (XSn) from the selector 8 in accordance with the levels of these signals (Sse) and (XSe).

Figure 28:
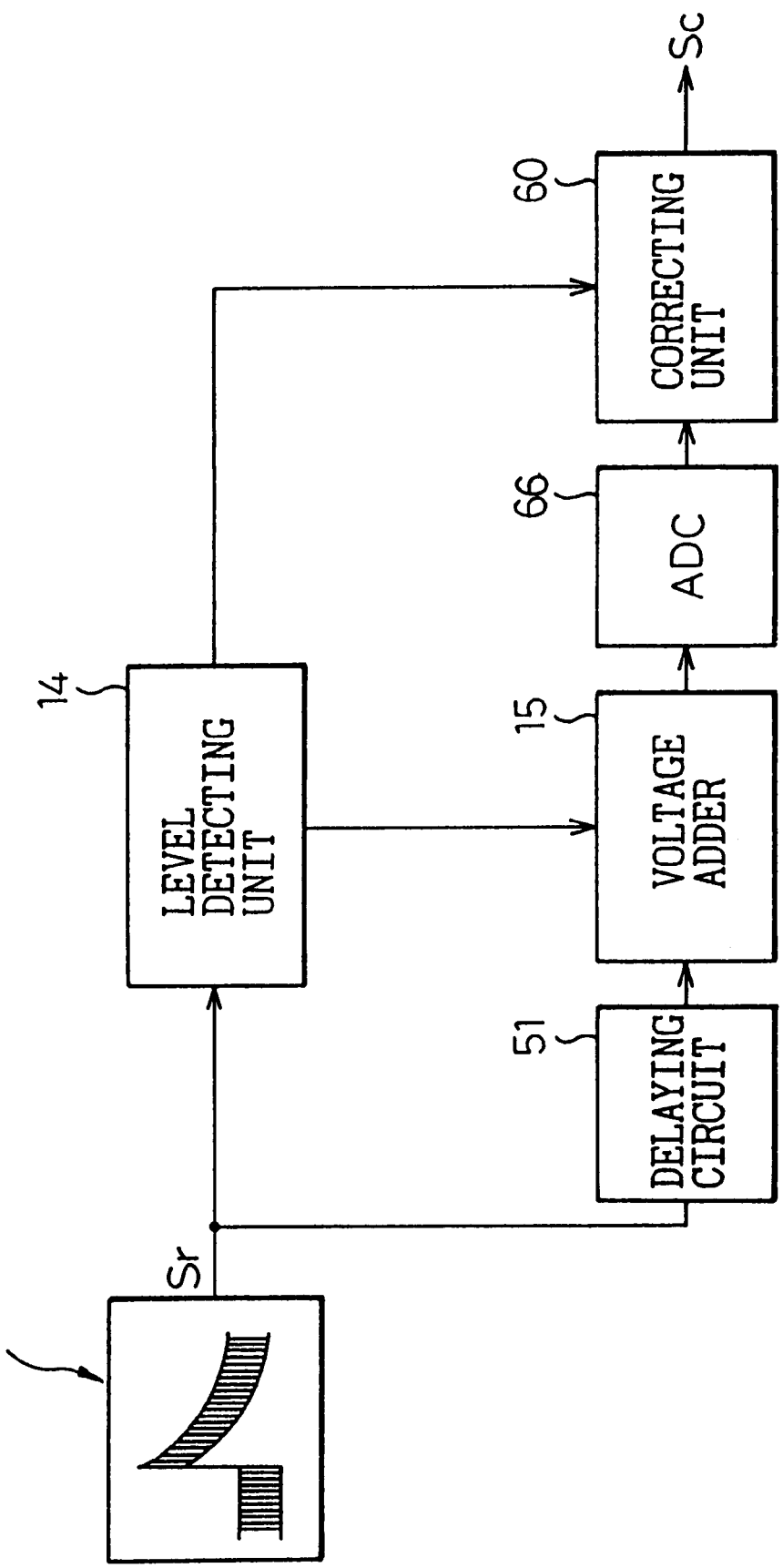
FIG. 28 is a block diagram showing the construction of the eleventh embodiment of the present invention.

FIG. 28 is a block diagram showing the construction of the eleventh embodiment of the present invention. Reference numeral 15 denotes a voltage adder.

As shown in FIG. 28, the eleventh embodiment adds the voltage adder 15 between the delaying circuit 51 and the analog/digital converting unit 66 in the second embodiment shown in FIG. 12. This voltage adder 15 applies a voltage bias to the analog reproduced signal Sr.

In other words, when correction of thermal asperity (correcting unit 60) is effected at the post-stage portion of the analog/digital converting unit 66, the output gets into saturation beyond the dynamic range if the signal having added thereto thermal asperity is merely inputted to the analog/digital converting unit 66. Therefore, this eleventh embodiment prevents this voltage saturation at the analog/digital converting unit 66 by changing the addition level at the voltage adder 15.

Here, the maximum level A of thermal asperity is determined by the below-mentioned formulas (a) to (g), and the addition level at the voltage adder 15 can be changed. In this way, voltage saturation at the analog/digital converting unit 66 can be prevented.

Figure 29:
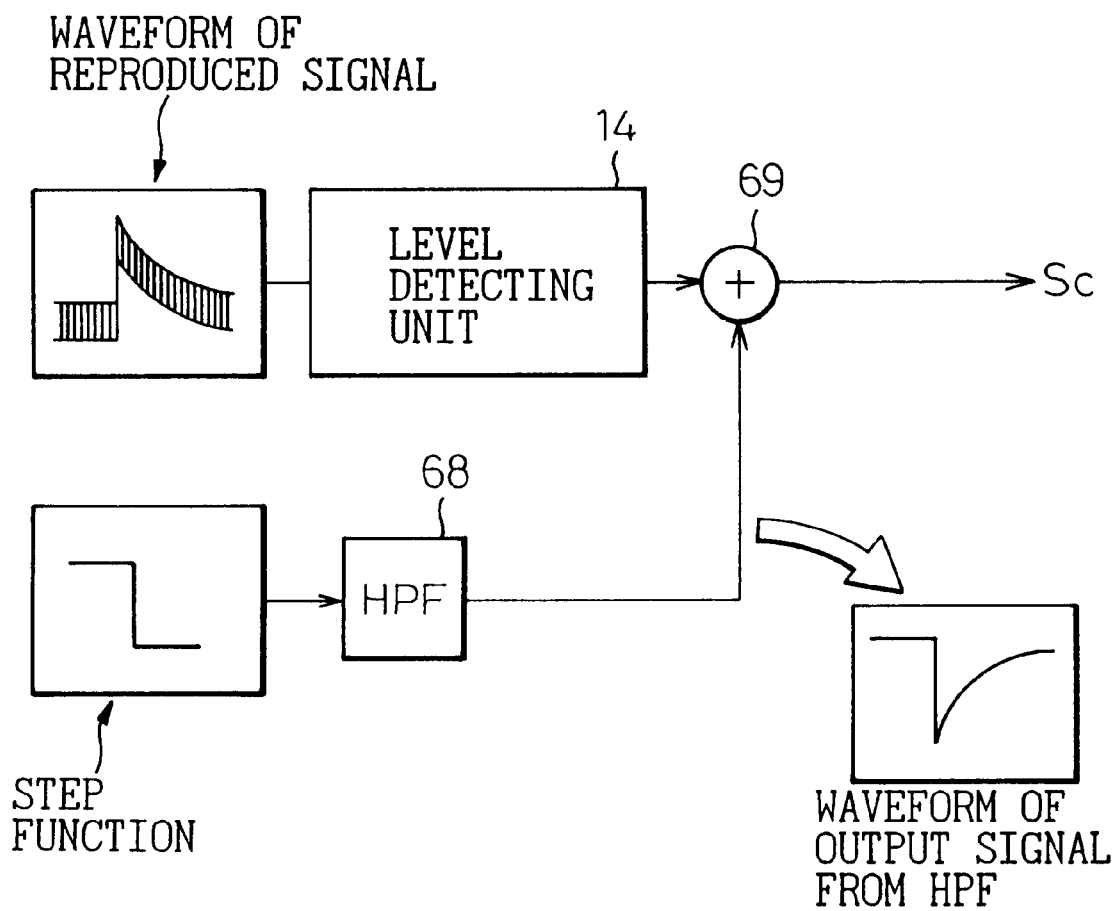
FIG. 29 is a block diagram showing the construction of the twelfth embodiment of the present invention.

FIG. 29 is a block diagram showing the construction of the twelfth embodiment of the present invention. In the drawing, reference numeral 68 denotes a high pass filter, and reference numeral 69 denotes the adder.

As shown in FIG. 29, this twelfth embodiment passes a step function through the high pass filter 68, adds it to the reproduced signal Sr and executes a correction process on the basis of this addition result.

In other words, since the level fluctuation component of the reproduced signal by thermal asperity can be approximated to the differentiation waveform of the step function in this twelfth embodiment, the high pass filter 68 is applied to the step function which is prepared in advance, and the result is added to the analog reproduced waveform so as to cancel the level fluctuation component. Here, the transmission function of the high pass filter 68 must be determined in accordance with the level fluctuation quantity of thermal asperity.

Next, a method of determining the transmission function of the high pass filter 68 will be explained. Here, the explanation will be given in the case in which two kinds of levels are disposed as an example of a plurality of threshold levels.

When the level fluctuation phenomenon due to thermal asperity is approximated by an exponential function curve, the threshold levels Vs1 and Vs2 can be expressed as follows:

$$Vs1 = A \times \exp(-t1/\tau) \qquad (a)$$

$$Vs2 = A \times \exp(-t2/\tau) \qquad (b)$$

Here, an unknown quantity A is the maximum value of level fluctuation, and an unknown quantity $\tau$ is a time constant of the exponential function.

Since the form of the exponential function curve can be known by determining A and $\tau$, A can be expressed as follows from the equations (a) and (b):

$$A = Vs1 = \exp(t1/\tau)$$

$$= Vs2 = \exp(t2/\tau) \qquad (c)$$

Therefore, $$Vs2/Vs1 = \exp\{(t1-t2)/\tau\} \qquad (d)$$

$$= (t1-t2)/\{\log(Vs2/Vs1)\} \qquad (e)$$

Therefore, A can be determined by putting this into the formula (a) or (b).

Since this exponential function curve V (t) can be therefore expressed as follows:

$$V(t) = A \times \exp(t1/\tau) \qquad (f)$$

the transmission function can be obtained as follows by performing Laplace transformation for V (t):

$$F(s) = \int \{A \times \exp(t1/\tau) \times \exp(-st)\} dt \qquad (g).$$

Therefore, when the step function prepared in advance is multiplied by the transmission function F (s) obtained by the equation (g) given above, the level fluctuation due to thermal asperity can be reproduced. When this value is substrated from the original waveform data, thermal asperity can be corrected.

According to the calculation described above, the number of a plurality of thresholds may be at least two kinds, but in order to obtain the level fluctuation, a larger number is more preferred.

Therefore, the transmission function of the high pass filter 68 can be determined by utilizing the switching time between the high level "H" and the low level "L" of the output signals of the comparator.

Incidentally, to detect thermal asperity, a relatively long time is necessary until the judgement (decision) is made regarding the occurrence of thermal asperity. Therefore, the correction process is executed in the correcting unit as soon as the data waveform exceeds the set threshold level, and when thermal asperity is not judged thereafter such as when an extra noise adds to the data, for example, the correction process in the correction unit is stopped and the data signal as such is delivered.

In other words, a correction process is started when the level of the reproduced signal Sr exceeds the threshold level and the correction process is completed when the level of the reproduced signal becomes smaller than the threshold level.

In the explanation given above, one of the threshold levels is set to the level corresponding to a magnitude of 1.5 times as large as the amplitude of the reproduced signal as one reference, and other threshold levels are set before and after this reference level. Needless to say, however, this threshold level can be set to an optimal level.

Figure 30:
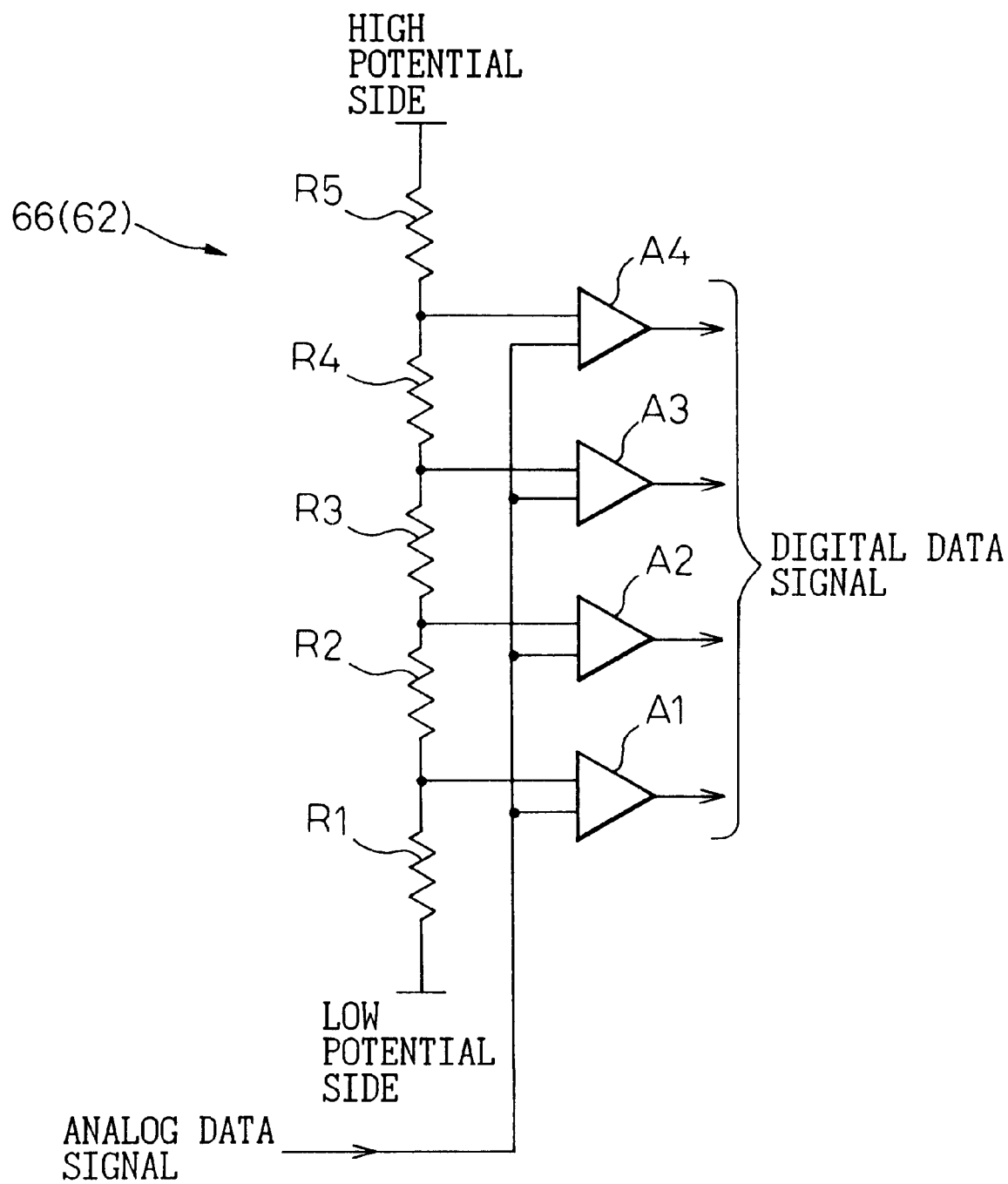
FIG. 30 is a circuit diagram showing a structural example of an analog/digital (A/D) convertor used in the embodiment of the present invention.

FIG. 30 is a circuit diagram showing a structural example of the analog/digital convertor used in the embodiment of the present invention.

As shown in FIG. 30, the analog/digital convertor 66 (62) includes a plurality of resistors R1 to R5 and a plurality of comparators A1 to A4 that are connected in series, respectively, between the high potential side (high potential power source line) and the low potential side (low potential power source line). The analog data signal and a different comparison voltage divided by a plurality of resistors R1 to R5 are supplied to each of these comparators A1 to A4. Each comparator compares the analog data signal with each comparison voltage and outputs the digital data signal corresponding to this analog digital data signal.

Figure 31:
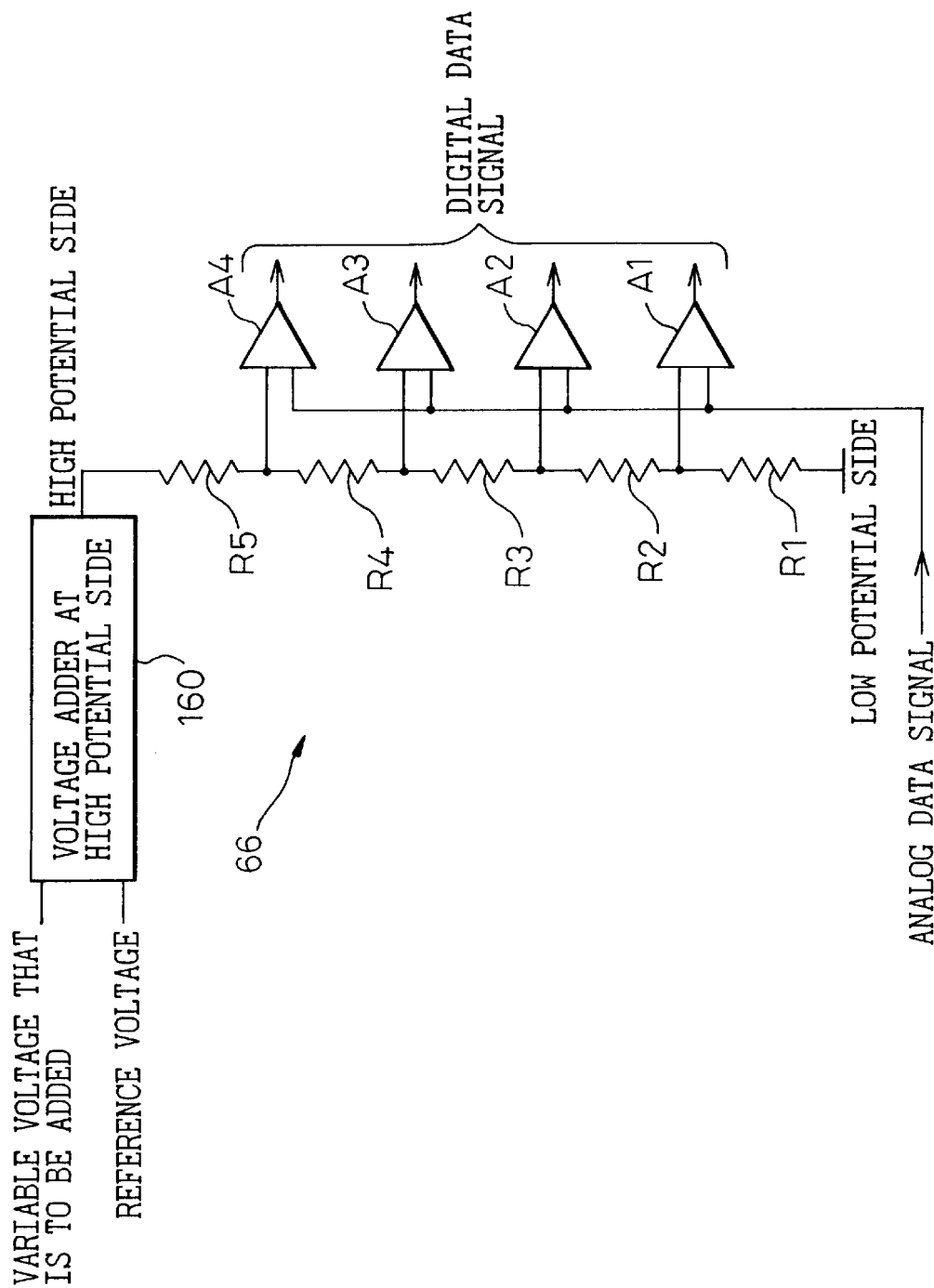
FIG. 31 is a circuit diagram showing the first modified example of the A/D convertor used in the embodiment of the present invention.
Figure 32:
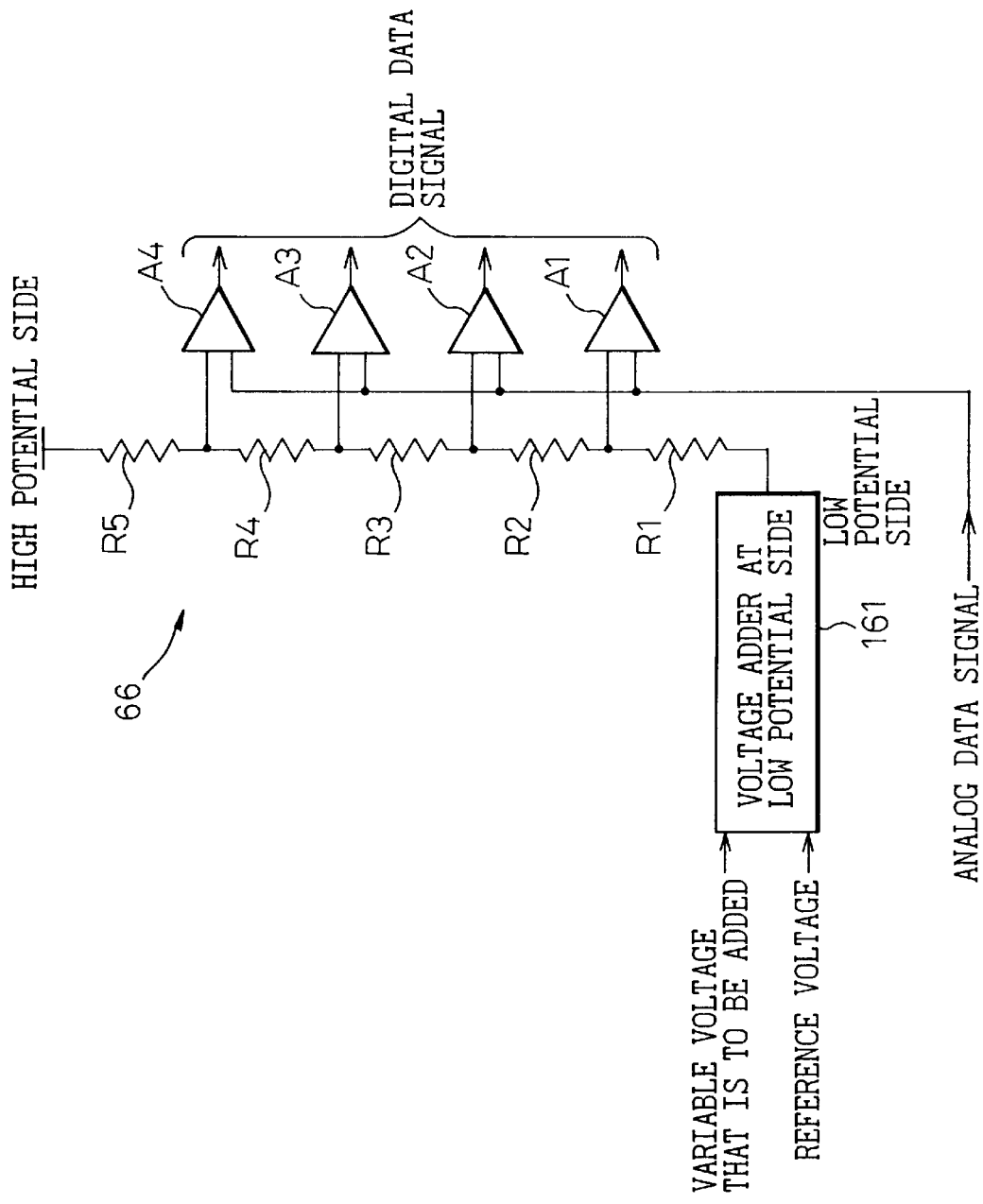
FIG. 32 is a circuit diagram showing the second modified example of the A/D convertor used in the embodiment of the present invention.
Figure 33:
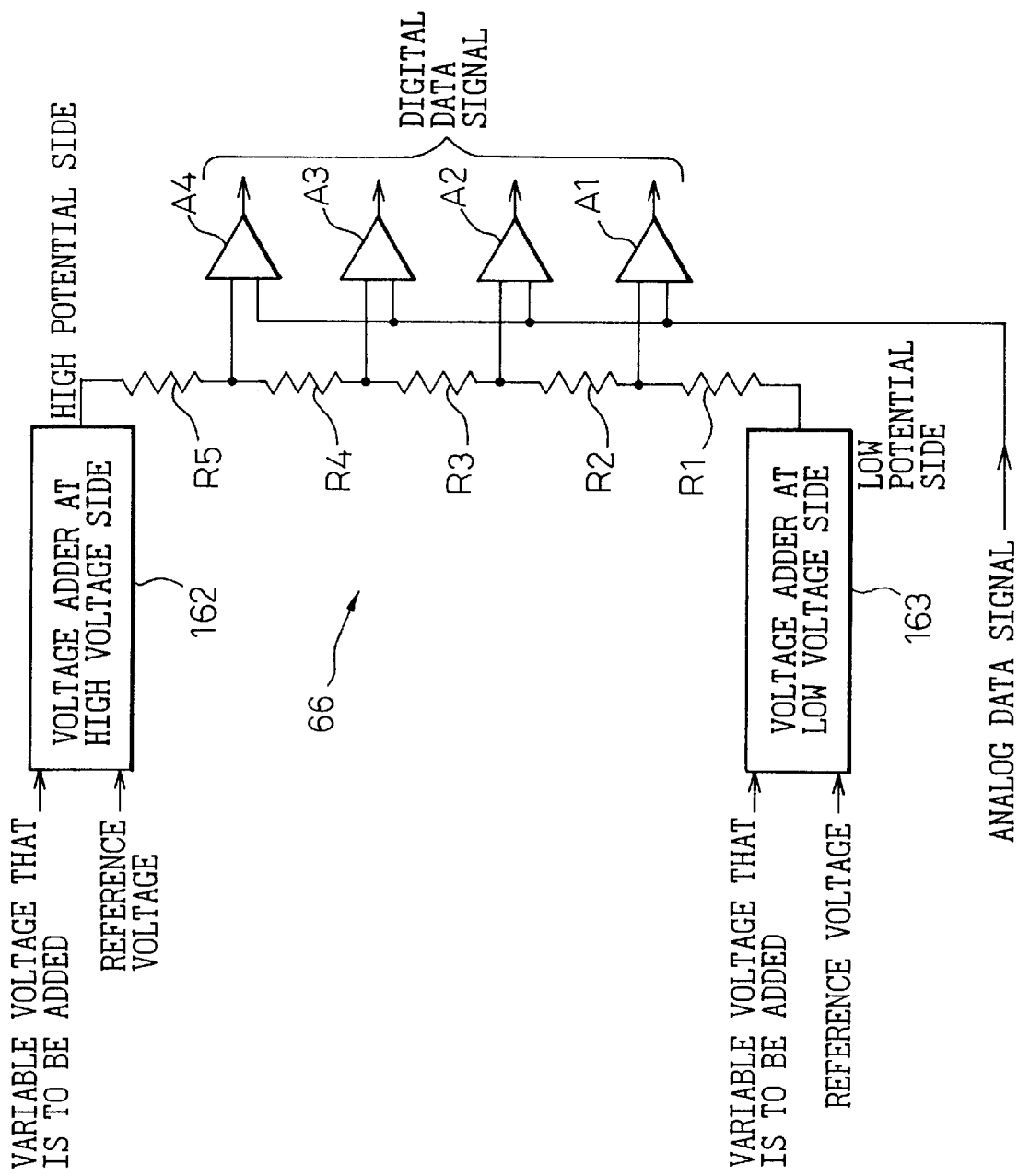
FIG. 33 is a circuit diagram showing the third modified example of the A/D convertor used in the embodiment of the present invention.

FIGS. 31 to 33 are circuit diagrams each showing a modified example of the analog/digital convertor 66 used in the embodiments of the present invention. These modified examples are constructed so that the analog/digital converting unit 66 changes its operation range lest it gets into saturation against the reproduced voltage which fluctuates due to thermal asperity. Each drawing illustrates a flash type analog/digital convertor 66 generally used for potential variable semiconductor devices by reducing the number of bits for the purpose of explanation, by way of example.

As shown in FIG. 31, the first modified example of the analog/digital convertor 66 includes a high potential side voltage adder 160 on the high potential side, and uses the output voltage of this high potential side voltage adder 160 as the voltage of the high potential side. The reference voltage and a variable voltage that is to be added are applied to the high potential side voltage adder 160 so that the operation range can be shifted by controlling the high potential side of the analog/digital converting unit 66.

In the second embodiment shown in FIG. 12, when the level detecting unit 14 detects thermal asperity, the control signal for changing the operation range of the analog/digital converting unit 66 is outputted to this analog/digital converting unit 66, and in this way, the variable voltage to be added is added to the reference voltage (ordinary high potential power source voltage), so that the voltage which is shifted to the high potential side can be used as the voltage on the high potential side. Accordingly, the dynamic range of the analog/digital converting unit 66 an be expanded, and saturation does not occur against the reproduced voltage which changes due to thermal asperity.

In the second modified example of the analog/digital convertor 66 shown in FIG. 32, a low potential side voltage adder 161 is disposed on the low potential side, and the output voltage of this low potential side voltage adder 161 is used as the voltage on the low potential side. The reference voltage and the variable voltage to be added are added to this low potential side voltage adder 161, and the operation range can be shifted by controlling the low potential side of the analog/digital converting unit 66.

In other words, in the second embodiment shown in FIG. 12, when the level detecting unit 14 detects thermal asperity, the control signal for changing the operation range of the analog/digital converting unit 66 is outputted to this analog/digital converting unit 66. Accordingly, the variable voltage to be added (negative voltage) is added to the reference voltage (ordinary low potential power source voltage), and the voltage shifted to the lower potential side is used as the voltage of the low potential side. In consequence, the dynamic range of the analog/digital converting unit 66 is expanded, and saturation does not occur against the reproduced voltage which changes due to thermal asperity.

In the third modified example of the analog/digital convertor 66 shown in FIG. 33, both of the high potential side voltage adder 160 (162) and the low potential side voltage adder 161 (163) in the first and second modified examples are disposed, and when the level detecting unit 14 detects thermal asperity, the voltages on both the high and low potential sides are shifted to the high and low potential sides, respectively, so as to expand the dynamic range. In consequence, the analog/digital converting unit 66 does not get into saturation even against the reproduced voltage which changes due to thermal asperity.

As described above, the magnetic disk reproducing apparatus according to the present invention can correct thermal asperity, and can limit an error concerning the reproduced signal, to the error that has occurred in a short time period corresponding to only a few bits necessary for detecting thermal asperity.

Figure 34:
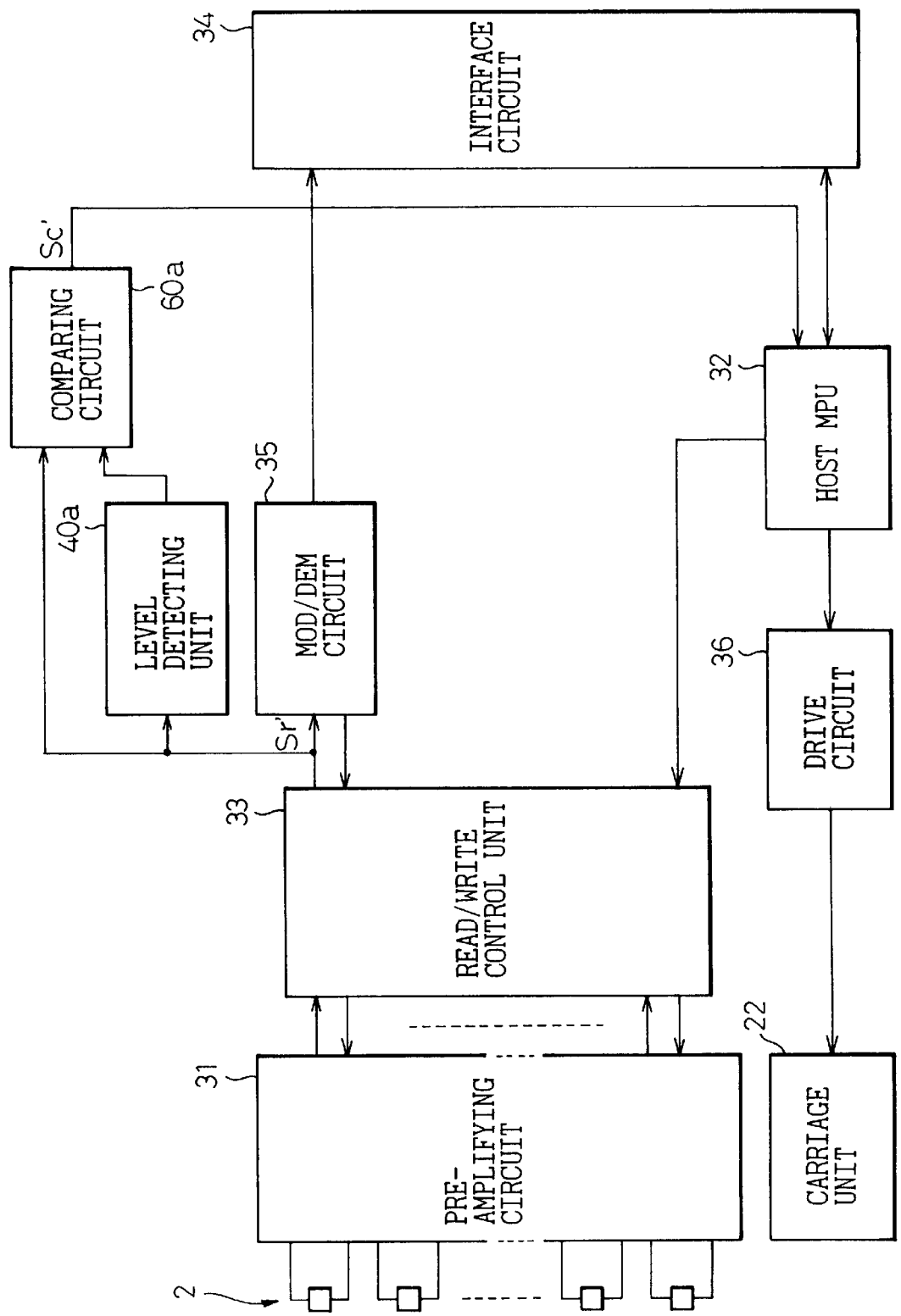
FIG. 34 is a block diagram showing the construction of the thirteenth embodiment of the present invention.

FIG. 34 is a block diagram showing the construction of the thirteenth embodiment of the present invention. The basic construction of this embodiment is the same as the construction explained with reference to FIG. 10.

As shown in FIG. 34, a plurality of heads (MR heads) 2 are disposed in this thirteenth embodiment, and are connected to the read/write control unit 33 through the pre-amplifying circuit (pre-amplifier) 31. The reproduced signal Sr' as the output of the read/write control unit 33 is outputted through the modulation/demodulation circuit 35 and through the interface circuit 34 and is also applied to the host MPU 32. Further, the reproduced signal Sr' is also supplied to the level detecting unit 40a and to the comparison circuit 60a, and the output (Sc') of the comparison circuit 60a is supplied to the host MPU 32. In other words, the host MPU 32 is so arranged as to receive the output Sc' of the comparison circuit 60a representative of the defect.

The host MPU 32 executes various controls inside the disk apparatus (magnetic disk reproducing apparatus) and also controls the commands and data between it and host apparatuses. The read/write control unit 33 executes read/write control, etc., of the data to the disk mechanism unit 30 on the basis of the instruction from the host MPU 32 through the pre-amplifier 31. Receiving the seek command from the host MPU 32, the drive circuit 36 drives and controls the carriage unit 32 and executes positioning control of the head 2, and the like.

Here, the level detecting unit 40a may include a filter for removing the noise (low pass filter), for example, in the same way as in the fourth embodiment shown in FIG. 14. The characteristics of this filter can be switched for each cylinder.

It is further possible to constitute the comparison circuit 60a so as to include the noise removing filter, and to switch the characteristics of this filter for each cylinder. By the way, the characteristics of the filter inside the level detecting unit 40a may be set to the same characteristics as those of the filter inside the comparison circuit 60a.

FIG. 35 is a flowchart useful for explaining the operation of the thirteenth embodiment of the present invention.

To execute a defect detection process of the medium (magnetic disk medium), the command is first generated from the host apparatus (host) to the interface circuit 34 for executing the defect detection process of the medium, and the interface circuit 34 reports this command to the host MPU 32.

When such a defect detection process of the medium is started, the head address/cylinder address is first set to the initial value (0, 0) at step S1. More concretely, the address 0 of the head 2 connected to the pre-amplifying circuit (pre-amplifier) 31 is selected, and the driving circuit 36 is controlled so that the head is positioned to the cylinder 0 position, and the carriage 22 is operated.

The flow then proceeds to step S2, at which the data is written. The flow further proceeds to step S3 in which the data so written is read out. In other words, after the data is written to the selected track of the magnetic disk medium, the data is read.

The flow then proceeds to step S4, and it is discriminated whether or not there is any position from which the data cannot be read out. In other words, after the data is written to the selected track, the position of the defect is detected by reading out the data and at the same time, the level detecting unit 40a detects the average amplitude round one circumference of the track on the basis of the output of the pre-amplifier 31 amplifying the reproduced signal of the head 2. The position at which an abnormal amplitude change occurs is detected by comparing the signal so detected, with the original output of the pre-amplifier 31. When any position from which the data cannot be read out is judged as existing at the step S4, the flow proceeds to step S5, and it is judged whether or not any interruption request is made from the comparison circuit 60a at step S5.

When it is judged that no interrupt is made from the comparison circuit 60a to the host MPU 32 at step S5, the flow then proceeds to step S6, and the position from which the data cannot be read out is registered as the defect (ordinary defect or usual defect). Thereafter, the flow proceeds to step S7.

On the other hand, when any interrupt is judged as occurring from the comparison circuit 60a to the host MPU 32 at step S5, the flow proceeds to step S11 if the reproduced signal fluctuates due to thermal asperity and an abnormal waveform (for example, waveforms shown in FIGS. 3 to 6) is detected, and the defect is registered as a medium defect (specific defect) due to an abnormal protuberance on the medium. The flow further proceeds to step S12 and defects are also registered for N bytes before and after this defect. The step proceeds to step S13, and the defects are registered for the same positions of M tracks inside and outside the track of this defect. The flow further proceeds to step S7. In other words, assuming that the defect so detected is the one that has the possibility of expansion, the defect information is registered in the positions of the N bytes before and after this defect and to the same positions of M tracks inside and outside the track of this defect. Thereafter, the flow proceeds to step S7.

When the output of the comparison circuit 60a does not exist, the possibility is small that the defect expands over a broad range. Therefore, when the registration position of the defect for each head is the same and the addresses are adjacent to one another, the defect is registered in the same position of the tracks before and after the track having such a defect. When the output of the comparison circuit 60a exists (that is, when fluctuation of the reproduced signal occurs due to thermal asperity), there is a possibility of an expansion in the defect over a broad range if the registration position of the defect for each head is the same and the addresses are adjacent to one another. Therefore, the process is executed so that the range of the head is not used.

Whether or not the head (head address) has the MAX value is judged at step S7. If the head is not judged as having the MAX value, "1" is added to the head address at step S8 and the flow returns to step S2. If the head is judged as having the MAX value at step S7, the flow proceeds to step S9, and it is judged whether or not the cylinder (cylinder address) has the MAX value. In other words, when the defect detection process of this track is completed, the head is incremented by +1, and the same process is executed in other tracks. When the head address exceeds the maximum head number, the head address is returned to 0, and the cylinder address is incremented by +1. Finally, the detection/registration process of the defect is executed for all the tracks by carrying out the similar process.

When the cylinder is not judged as having the MAX value at step S9, "1" is added to the cylinder address at step S10 and then the flow returns to step S2. On the other hand, when the cylinder is judged as having the MAX value at step S9, the process for all the head addresses and all the cylinder addresses (for all the disk media) is completed, and the defect detection process is therefore completed.

As described above, according to the thirteenth embodiment, the defect having the possibility of expansion during the use of the apparatus (due to a change in quality with the lapse of time) is registered in advance, and a deterioration concerning read/write errors at the user's side can be avoided.

What is claimed is:

1. A magnetic disk reproducing apparatus for reproducing data recorded at an arbitrary track of a rotating disk, comprising:

a level detecting unit for comparing the waveform of a reproduced signal with predetermined threshold levels, said level detecting unit including a first comparator, a low pass filter and a second comparator, said level detecting unit being configured and disposed to compare said waveform to one of said predetermined threshold levels both before and after passing through said low pass filter; and a correcting unit for correcting the level of a DC component of said reproduced signal in accordance with a result of comparison in said level detecting unit.

2. A magnetic disk reproducing apparatus according to claim 1, wherein a correction is made when the level of the DC component of said reproduced signal continues to exceed said threshold level for at least a predetermined time.

3. A magnetic disk reproducing apparatus according to claim 1, wherein a correction is made when a switching phenomenon in which the level of said reproduced signal nearly exceeds, or does not exceed, said threshold level occurs at a predetermined frequency or any other frequency higher than said predetermined frequency, or when said switching exists for at least a predetermined time.

4. A magnetic disk reproducing apparatus according to claim 1, wherein a plurality of said threshold levels are set.

5. A magnetic disk reproducing apparatus according to claim 1, wherein said reproduced waveform is passed through a low-pass filter, a threshold level is set for the output of said low pass filter, and a correction is made when the output of said low pass filter exceeds said threshold level for at least a predetermined time.

6. A magnetic disk-reproducing apparatus according to claim 1, wherein a correction is selected by a selector circuit only when thermal asperity exists.

7. A magnetic disk reproducing apparatus according to claim 1, which further comprises a voltage adder for applying a voltage bias to said reproduced signal.

8. A magnetic disk reproducing apparatus according to claim 1, wherein a high pass filter is applied to a step function, the result is added to said reproduced signal, and a correction process is executed by the addition result.

9. A magnetic disk reproducing apparatus according to claim 1, wherein a correction process is started when the level of said reproduced signal is larger than said threshold level and is completed when the level of said reproduced signal is smaller than said threshold level.

10. A magnetic disk reproducing apparatus according to claim 1, wherein the operation range of analog/digital converting unit is shifted.

11. A magnetic disk reproducing apparatus according to claim 2, wherein a plurality of said threshold levels are set, and a signal passed through said low pass filter is compared with other threshold levels.

12. A magnetic disk reproducing apparatus according to claim 3, wherein a plurality of said threshold levels are set, and are switched at a predetermined frequency or any other frequency higher than said predetermined frequency.

13. A magnetic disk reproducing apparatus according to claim 4, wherein the clock of a variable frequency oscillator is stopped for the time corresponding to a product obtained by multiplying the time, in which the level of said reproduced signal continues to exceed one of a plurality of said threshold levels, by a predetermined constant, and the oscillation frequency of said variable frequency oscillator is kept fixed.

14. A magnetic disk reproducing apparatus according to claim 4, wherein the gain of an automatic gain control circuit is fixed for the time corresponding to a product obtained by multiplying the time, in which the level of said reproduced signal continues to exceed one of a plurality of said threshold levels, by a predetermined time constant.

15. A magnetic disk reproduction apparatus according to claim 11, wherein the clock of said variable frequency oscillator is extracted in accordance with the low level or the high level of the output signal of said comparator, or the oscillation frequency of said variable frequency oscillator is fixed.

16. A magnetic disk reproducing apparatus according to claim 11, wherein the gain of said automatic gain control circuit is made variable in accordance with the low level or the high level of the output signal of said comparator, or is fixed.

17. A magnetic disk reproducing apparatus according to claim 1, further comprising a head is equipped with a magnetoresistance effect type head using a magnetoresistive element, and which corrects the fluctuation of said reproduced signal resulting from thermal asperity due to the collision between said magnetorisistance effect type head and a protuberance on said disk.

18. A magnetic disk reproducing apparatus according to claim 1, further comprising:

an analog/digital converting unit for converting said reproduced signal outputted from said delaying circuit into a digital reproduced signal, and for outputting said digital reproduced signal to said correcting unit.

19. A method of controlling a magnetic disk reproducing apparatus for reproducing data recorded at an arbitrary track on a rotating disk by a head, comprising the steps of:

detecting a level of a DC component of a reproduced signal outputted from said head by comparing a waveform of the reproduced signal with predetermined threshold levels including the steps of comparing said waveform to one of said predetermined threshold levels both before and after passing through a low pass filter; and correcting the level of the DC component of said reproduced signal when the level of the DC component contained in said detection signal becomes larger than said one predetermined threshold level.

* * * * *

UNITED STATES PATENT AND TRADEMARK OFFICE
CERTIFICATE OF CORRECTION

PATENT NO. : 6,104,557
DATED : August 15, 2000
INVENTOR(S) : Kasai et al.

It is certified that error appears in the above-indentified patent and that said Letters Patent is hereby corrected as shown below:

Column 23, line 2, after "level", please insert --which-- therefor

Column 23, line 30, after "of", please insert --a-- therefor

Signed and Sealed this

First Day of May, 2001

Attest:

NICHOLAS P. GODICI

*Attesting Officer*     *Acting Director of the United States Patent and Trademark Office*